US012372916B2

(12) United States Patent
Adachi et al.

(10) Patent No.: US 12,372,916 B2
(45) Date of Patent: Jul. 29, 2025

(54) IMAGE-FORMING APPARATUS INCLUDING MECHANISM FOR OPENING AND CLOSING SHUTTER OF ATTACHED DRUM CARTRIDGE IN INTERLOCKING RELATION TO OPENING AND CLOSING MOVEMENT OF COVER

(71) Applicant: BROTHER KOGYO KABUSHIKI KAISHA, Nagoya (JP)

(72) Inventors: Aya Adachi, Kasugai (JP); Shougo Sato, Seto (JP); Kazuna Taguchi, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/735,339

(22) Filed: Jun. 6, 2024

(65) Prior Publication Data

US 2024/0319660 A1 Sep. 26, 2024

Related U.S. Application Data

(63) Continuation of application No. PCT/JP2022/046812, filed on Dec. 20, 2022.

(30) Foreign Application Priority Data

Dec. 27, 2021 (JP) ................................ 2021-213280

(51) Int. Cl.
*G03G 21/16* (2006.01)
*G03G 15/04* (2006.01)
(Continued)

(52) U.S. Cl.
CPC ... *G03G 21/1832* (2013.01); *G03G 15/04036* (2013.01); *G03G 21/105* (2013.01);
(Continued)

(58) Field of Classification Search
CPC ............. G03G 15/04036; G03G 21/00; G03G 21/105; G03G 21/12; G03G 21/16;
(Continued)

(56) References Cited

U.S. PATENT DOCUMENTS

| | | | |
|---|---|---|---|
| 6,266,511 | B1 | 7/2001 | Murakami et al. |
| 2006/0051126 | A1 | 3/2006 | Kweon |

(Continued)

FOREIGN PATENT DOCUMENTS

| | | | |
|---|---|---|---|
| JP | 61-114270 | A | 5/1986 |
| JP | 2002-49287 | A | 2/2002 |

(Continued)

OTHER PUBLICATIONS

International Preliminary Report on Patentability issued in corresponding International Patent Application No. PCT/JP2022/046812, Jun. 20, 2024.

(Continued)

*Primary Examiner* — Sophia S Chen
(74) *Attorney, Agent, or Firm* — Merchant & Gould P.C.

(57) ABSTRACT

An image-forming apparatus includes a housing, a cover, first and second drum cartridges, first and second exposing heads, first and second guides, a waste toner tube, a shutter driving member, and an interlocking mechanism. Each of the first and second drum cartridges includes: a photosensitive drum rotatable about an axis extending in a first direction; a drum cleaner; a discharging part; and a shutter. The first and second exposing heads are mounted on the cover. The first and second guides guide respective ends of the first and second exposing heads in the first direction while the cover is opened and closed. The shutter driving member is movable in a second direction in interlocking relation to the respective shutters through the interlocking mechanism. The shutter driving member is overlapped with (Continued)

1 at least one of the first and second guides in a third direction crossing both the first and second directions.

12 Claims, 12 Drawing Sheets

(51) Int. Cl.
*G03G 21/10* (2006.01)
*G03G 21/12* (2006.01)
*G03G 21/18* (2006.01)

(52) U.S. Cl.
CPC ......... *G03G 21/12* (2013.01); *G03G 21/1633* (2013.01); *G03G 21/1647* (2013.01); *G03G 21/1814* (2013.01); *G03G 21/1864* (2013.01)

(58) Field of Classification Search
CPC ........... G03G 21/1633; G03G 21/1647; G03G 21/18; G03G 21/1814; G03G 21/1832; G03G 21/1846
See application file for complete search history.

(56) References Cited

U.S. PATENT DOCUMENTS

| | | | | |
|---|---|---|---|---|
| 2006/0104663 | A1 | 5/2006 | Kitozaki | |
| 2014/0161491 | A1 | 6/2014 | Fukushima | |
| 2016/0033927 | A1 | 2/2016 | Sato et al. | |
| 2021/0240105 | A1* | 8/2021 | Fukuoka ............ | G03G 21/1814 |
| 2023/0350335 | A1* | 11/2023 | Sato ..................... | G03G 21/105 |

FOREIGN PATENT DOCUMENTS

| | | | |
|---|---|---|---|
| JP | 2008-52033 | A | 3/2006 |
| JP | 2007-86815 | A | 4/2007 |
| JP | 2006-139110 | A | 6/2008 |
| JP | 2014-115400 | A | 6/2014 |
| JP | 2016-33621 | A | 3/2016 |
| JP | 2020-86309 | A | 6/2020 |

OTHER PUBLICATIONS

International Search Report issued in corresponding PCT/JP2022/046812, Feb. 21, 2023.

* cited by examiner

IMAGE-FORMING APPARATUS INCLUDING MECHANISM FOR OPENING AND CLOSING SHUTTER OF ATTACHED DRUM CARTRIDGE IN INTERLOCKING RELATION TO OPENING AND CLOSING MOVEMENT OF COVER

REFERENCE TO RELATED APPLICATIONS

This is a by-pass continuation application of International Application No. PCT/JP2022/046812 filed on Dec. 20, 2022 claiming priority from Japanese Patent Application No. 2021-213280 filed on Dec. 27, 2021. The entire contents of the International Application and the priority application are incorporated herein by reference.

BACKGROUND ART

One conventional image-forming apparatus includes a process cartridge. The process cartridge includes a photosensitive drum, a cleaning member configured to remove residual toner deposited on the photosensitive drum, and a screw feeder configured to convey the residual toner removed from the photosensitive drum by the cleaning member.

SUMMARY

In the conventional image-forming apparatus described above, the residual toner conveyed by the screw feeder falls down through a through-hole of the process cartridge, and is conveyed to a collection unit.

Conceivably, the residual toner may be spilled out through the through-hole of the process cartridge when the process cartridge is detached from a housing of the image-forming apparatus by a user. To this effect, a shutter may be provided at the process cartridge for closing the through-hole. However, even in this configuration, the user may possibly forget to close the shutter when detaching the process cartridge from the housing of the image-forming apparatus.

In view of the foregoing, it is an object of the disclosure to provide an image-forming apparatus capable of restraining leakage of waste toner from respective first and second drum cartridges during detachment of the first and second drum cartridges from a housing of the image-forming apparatus.

In order to attain the above and other objects, the present disclosure provides an image-forming apparatus including a housing, a cover, a first drum cartridge, a second drum cartridge, a first exposing head, a second exposing head, a first guide, a second guide, a waste toner tube, a shutter driving member, and an interlocking mechanism.

The housing has an opening. The cover is movable between a cover closed position and a cover open position relative to the housing. The cover closes the opening when the cover is at the cover closed position. The cover opens the opening when the cover is at the cover open position. The first drum cartridge is attachable to the housing through the opening when the cover is at the cover open position. The first drum cartridge includes a first photosensitive drum, a first drum cleaner, a first discharging part, and a first shutter. The first photosensitive drum is rotatable about a first axis, the first axis extending in a first direction in a state where the first drum cartridge is attached to the housing. The first drum cleaner is configured to collect waste toner on a peripheral surface of the first photosensitive drum. The first discharging part has a first discharge opening through which the waste toner collected by the first drum cleaner is configured to be discharged. The first shutter is movable between a first-shutter closing position and a first-shutter open position relative to the first discharging part. The first shutter closes the first discharge opening when the first shutter is at the first-shutter closing position. The first shutter opens the first discharge opening when the first shutter is at the first-shutter open position. The second drum cartridge is attachable to the housing through the opening when the cover is at the cover open position. The second drum cartridge includes a second photosensitive drum, a second drum cleaner, a second discharging part and a second shutter. The second photosensitive drum is rotatable about a second axis, the second axis extending in the first direction in a state where the second drum cartridge is attached to the housing. The second drum cleaner is configured to collect waste toner on a peripheral surface of the second photosensitive drum. The second discharging part has a second discharge opening through which the waste toner collected by the second drum cleaner is configured to be discharged. The second shutter is movable between a second-shutter closing position and a second-shutter open position relative to the second discharging part. The second shutter closes the second discharge opening when the second shutter is at the second-shutter closing position. The second shutter opens the second discharge opening when the second shutter is at the second-shutter open position. The first exposing head is mounted on the cover. The first exposing head is configured to expose the peripheral surface of the first photosensitive drum to light when the cover is at the cover closed position. The second exposing head is mounted on the cover. The second exposing head is configured to expose the peripheral surface of the second photosensitive drum to light when the cover is at the cover closed position. The first guide is configured to guide one end portion of the first exposing head in the first direction while the cover moves between the cover closed position and the cover open position. The second guide is configured to guide one end portion of the second exposing head in the first direction while the cover moves between the cover closed position and the cover open position. The waste toner tube has a first waste toner inlet opening and a second waste toner inlet opening. The waste toner discharged through the first discharge opening is introduced into an interior of the waste toner tube through the first waste toner inlet opening in the state where the first drum cartridge is attached to the housing. The waste toner discharged through the second discharge opening is introduced into the interior of the waste toner tube through the second waste toner inlet opening in the state where the second drum cartridge is attached to the housing. The shutter driving member is movable in interlocking relation to movements of the first shutter and the second shutter in a state where both the first drum cartridge and the second drum cartridge are attached to the housing. The shutter driving member is movable in a second direction crossing the first direction between a first position and a second position relative to the waste toner tube. The interlocking mechanism connects the cover to the shutter driving member to move the cover and the shutter driving member in interlocking relation to each other. The shutter driving member is overlapped with at least one of the first guide and the second guide in a third direction crossing both the first direction and the second direction.

With the above structure, opening and closing of both the first shutter and the second shutter can be performed in interlocking relation to the opening and closing of the cover.

Specifically, the first shutter can be located at the first shutter open position and the second shutter can be located at the second shutter open position when the cover is at the cover closed position in the state where the first drum cartridge and the second drum cartridge are attached to the housing. Accordingly, the waste toner from the first photosensitive drum and the second photosensitive drum can be conveyed through the waste toner tube.

Further, since the first shutter can be located at the first shutter closing position and the second shutter can be located at the second shutter closing position when the cover is at the cover open position, the first drum cartridge and the second drum cartridge can be removable from the housing without leakage of the waste toner from the respective first and second drum cartridges.

Still further, since the shutter driving member is overlapped with at least one of the first guide and the second guide, the image-forming apparatus can be downsized with respect to the first direction.

DESCRIPTION

An image-forming apparatus 1 according to one embodiment of the present disclosure will be described with reference to FIGS. 1 through 12.

1. Overview of Image-Forming Apparatus 1

A general configuration of the image-forming apparatus 1 will be described with reference to FIG. 1 and FIG. 2.

Figure 1:
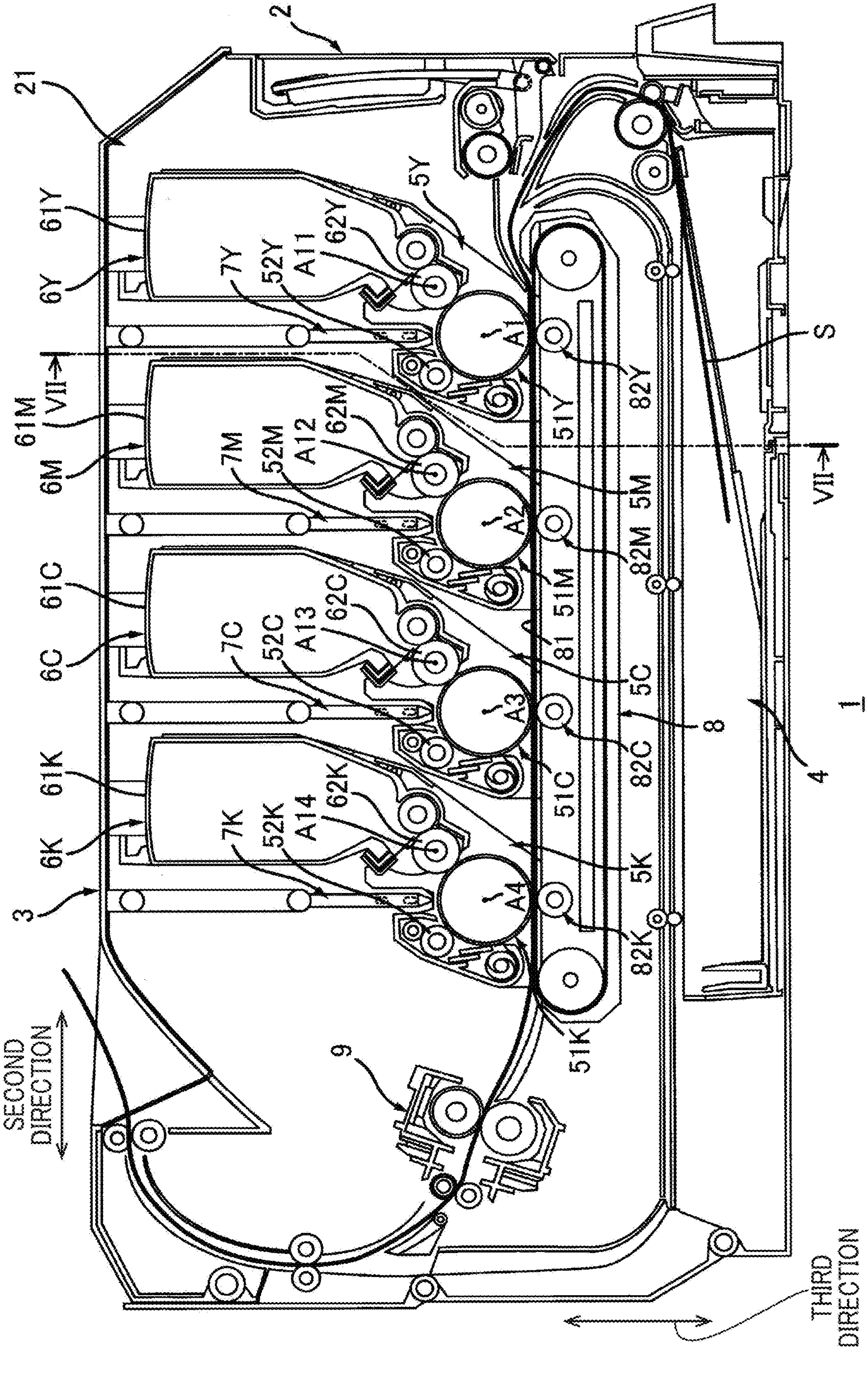
FIG. 1 is a schematic cross-sectional view illustrating a general structure of an image-forming apparatus according to one embodiment.

As illustrated in FIG. 1, the image-forming apparatus 1 includes a housing 2, a cover 3, a sheet accommodating unit 4, a plurality of drum cartridges 5Y, 5M, 5C, 5K, a plurality of developing cartridges 6Y, 6M, 6C, 6K, a plurality of exposing heads 7Y, 7M, 7C, 7K, a transferring device 8, and a fixing device 9.

1.1 Housing 2

The housing 2 accommodates therein the sheet accommodating unit 4, the plurality of drum cartridges 5Y, 5M, 5C, 5K, the plurality of developing cartridges 6Y, 6M, 6C, 6K, the plurality of exposing heads 7Y, 7M, 7C, 7K, the transferring device 8, and the fixing device 9. The housing 2 has an opening 21. The opening 21 is provided in an upper end of the housing 2.

1.2 Cover 3

Figure 2:
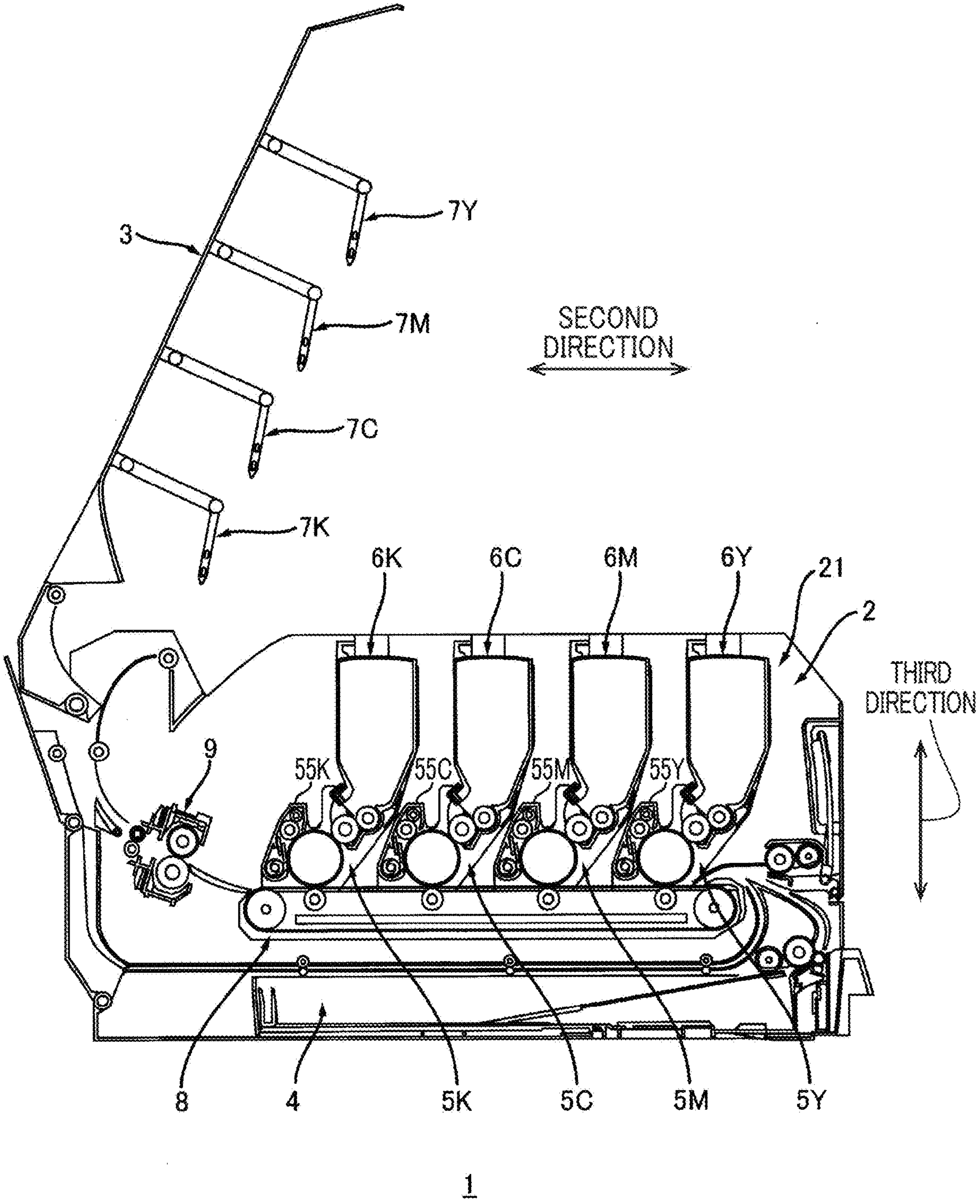
FIG. 2 is a schematic view of the image-forming apparatus illustrated in FIG. 1 in a state where a cover thereof is at its open position.

As illustrated in FIGS. 1 and 2, the cover 3 is movable between a cover closed position (depicted in FIG. 1) and a cover open position (depicted in FIG. 2). In a state where the cover 3 is at the cover closed position, the cover 3 closes the opening 21. In a state where the cover 3 is at the cover open position, the cover 3 uncovers the opening 21 to open the same.

1.3 Sheet Accommodating Unit 4

As illustrated in FIG. 1, the sheet accommodating unit 4 is configured to accommodate a sheet S therein. The sheet S in the sheet accommodating unit 4 is configured to be conveyed toward a photosensitive drum 51Y.

1.4 Drum Cartridges 5Y, 5M, 5C, 5K

As illustrated in FIG. 2, in the state where the cover 3 is at the cover open position, the drum cartridges 5Y, 5M, 5C and 5K are respectively attachable to the housing 2 through the opening 21.

As illustrated in FIG. 1, the drum cartridge 5Y includes the photosensitive drum 51Y and a charging device 52Y.

The photosensitive drum 51Y extends in a first direction. The photosensitive drum 51Y has a hollow cylindrical shape. The photosensitive drum 51Y is rotatable about an axis A1. The axis A1 extends in the first direction in a state where the drum cartridge 5Y is attached to the housing 2.

In the following description on the image-forming apparatus 1, the "first direction" will be referred to assuming that the drum cartridge 5Y is attached to the housing 2 of the image-forming apparatus 1.

The charging device 52Y is configured to charge a peripheral surface of the photosensitive drum 51Y. In the present embodiment, a charging roller is used as the charging device 52Y. Alternatively, a scorotron-type charger may be used as the charging device 52Y.

Each of the drum cartridges 5M, 5C and 5K has the same structure as the drum cartridge 5Y. That is, the drum cartridge 5M includes a photosensitive drum 51M and a charging device 52M. The photosensitive drum 51M is rotatable about an axis A2. The axis A2 extends in the first direction in a state where the drum cartridge 5M is attached to the housing 2. Likewise, the drum cartridge 5C includes a photosensitive drum 51C and a charging device 52C. The photosensitive drum 51C is rotatable about an axis A3. The axis A3 extends in the first direction in a state where the drum cartridge 5C is attached to the housing 2. The drum cartridge 5K includes a photosensitive drum 51K and a charging device 52K. The photosensitive drum 51K is rotatable about an axis A4. The axis A4 extends in the first direction in a state where the drum cartridge 5K is attached to the housing 2.

In a state where the drum cartridges 5Y, 5M, 5C and 5K are attached to the housing 2, the photosensitive drums 51Y, 51M, 51C and 51K are arrayed in a second direction. The second direction crosses the first direction. Preferably, the second direction be orthogonal to the first direction.

1.5 Developing Cartridges 6Y, 6M, 6C, 6K

The developing cartridge 6Y is attachable to and detachable from the drum cartridge 5Y. The developing cartridge 6Y includes a developing housing 61Y and a developing roller 62Y.

The developing housing 61Y is configured to accommodate toner therein. The developing housing 61Y supports the developing roller 62Y.

In a state where the developing cartridge 6Y is attached to the drum cartridge 5Y, the developing roller 62Y is configured to supply the toner accommodated in the developing housing 61Y to the photosensitive drum 51Y. The developing roller 62Y is in contact with the photosensitive drum 51Y in the state where the developing cartridge 6Y is attached to the drum cartridge 5Y. Incidentally, the developing roller 62Y may be configured to be separated away from the photosensitive drum 51Y in the state where the developing cartridge 6Y is attached to the drum cartridge 5Y and the drum cartridge 5Y is attached to the housing 2. The developing roller 62Y extends in the first direction. The developing roller 62Y is rotatable about a developing axis A11. The developing axis A11 extends in the first direction.

The developing cartridge 6M is attachable to and detachable from the drum cartridge 5M. The developing cartridge 6C is attachable to and detachable from the drum cartridge 5C. The developing cartridge 6K is attachable to and detachable from the drum cartridge 5K. Each of the developing cartridge 6M, 6C and 6K has the same structure as the developing cartridge 6Y.

Specifically, the developing cartridge 6M includes a developing housing 61M, and a developing roller 62M. The developing roller 62M is rotatable about a developing axis A12. The developing axis A12 extends in the first direction. Likewise, the developing cartridge 6C includes a developing housing 61C, and a developing roller 62C. The developing roller 62C is rotatable about a developing axis A13. The developing axis A13 extends in the first direction. The developing cartridge 6K includes a developing housing 61K, and a developing roller 62K. The developing roller 62K is rotatable about a developing axis A14. The developing axis A14 extends in the first direction.

1.6 Exposing Heads 7Y, 7M, 7C, 7K

The exposing heads 7Y, 7M, 7C and 7K are mounted on the cover 3. In a state where the drum cartridges 5Y, 5M, 5C and 5K are attached to the housing 2 and the cover 3 is at the cover closed position, the exposing heads 7Y, 7M, 7C and 7K are configured to expose respective peripheral surfaces of the photosensitive drums 51Y, 51M, 51C and 51K to light.

1.7 Transferring Device 8

The transferring device 8 includes a belt 81, and a plurality of transfer rollers 82Y, 82M, 82C and 82K.

In the state where the drum cartridge 5Y is attached to the housing 2, the belt 81 is in contact with the photosensitive drum 51Y. In the state where the drum cartridge 5M is attached to the housing 2, the belt 81 is in contact with the photosensitive drum 51M. In a state where the drum cartridge 5C is attached to the housing 2, the belt 81 is in contact with the photosensitive drum 51C. In a state where the drum cartridge 5K is attached to the housing 2, the belt 81 is in contact with the photosensitive drum 51K. The belt 81 is configured to convey the sheet S in the sheet accommodating-unit 4 toward the fixing device 9.

The transfer roller 82Y is configured to transfer the toner from the peripheral surface of the photosensitive drum 51Y to the sheet S that is being conveyed by the belt 81. The transfer roller 82M is configured to transfer the toner from the peripheral surface of the photosensitive drum 51M to the sheet S that is being conveyed by the belt 81. The transfer roller 82C is configured to transfer the toner from the peripheral surface of the photosensitive drum 51C to the sheet S that is being conveyed by the belt 81. The transfer roller 82K is configured to transfer the toner from the peripheral surface of the photosensitive drum 51K to the sheet S that is being conveyed by the belt 81.

1.8 Fixing Device 9

The fixing device 9 is configured to apply heat and pressure to the sheet S on which the toner has been transferred for thermally fixing the toner to the sheet S. The sheet S having moved past the transferring device 8 is configured to be discharged on an upper surface of the cover 3.

2. Details of Drum Cartridge 5Y

Next, the drum cartridge 5Y will be described in detail with reference to FIGS. 3 through 6.

Figure 3:
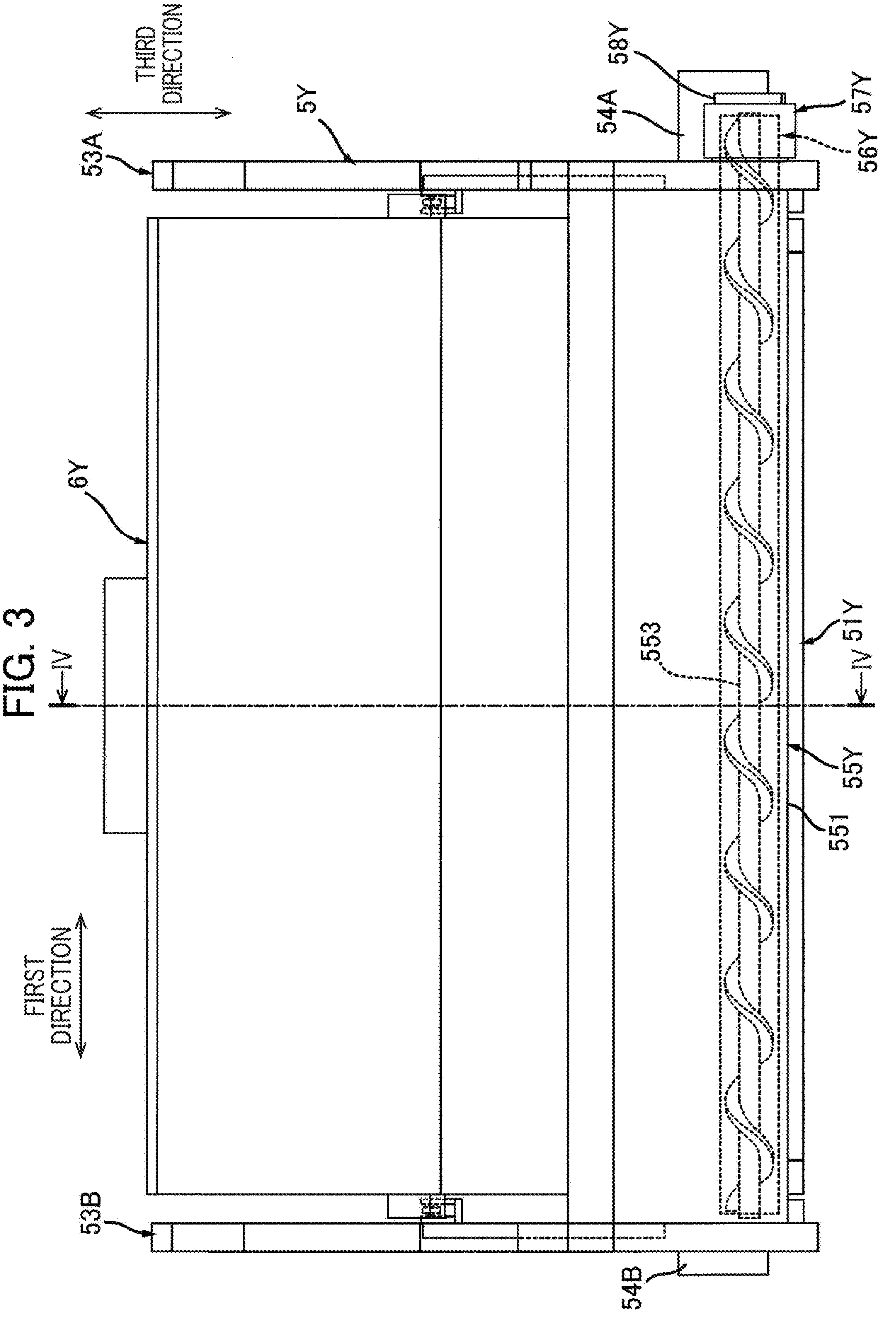
FIG. 3 is a side view of a drum cartridge illustrated in FIG. 1 as viewed in a second direction.
Figure 4:
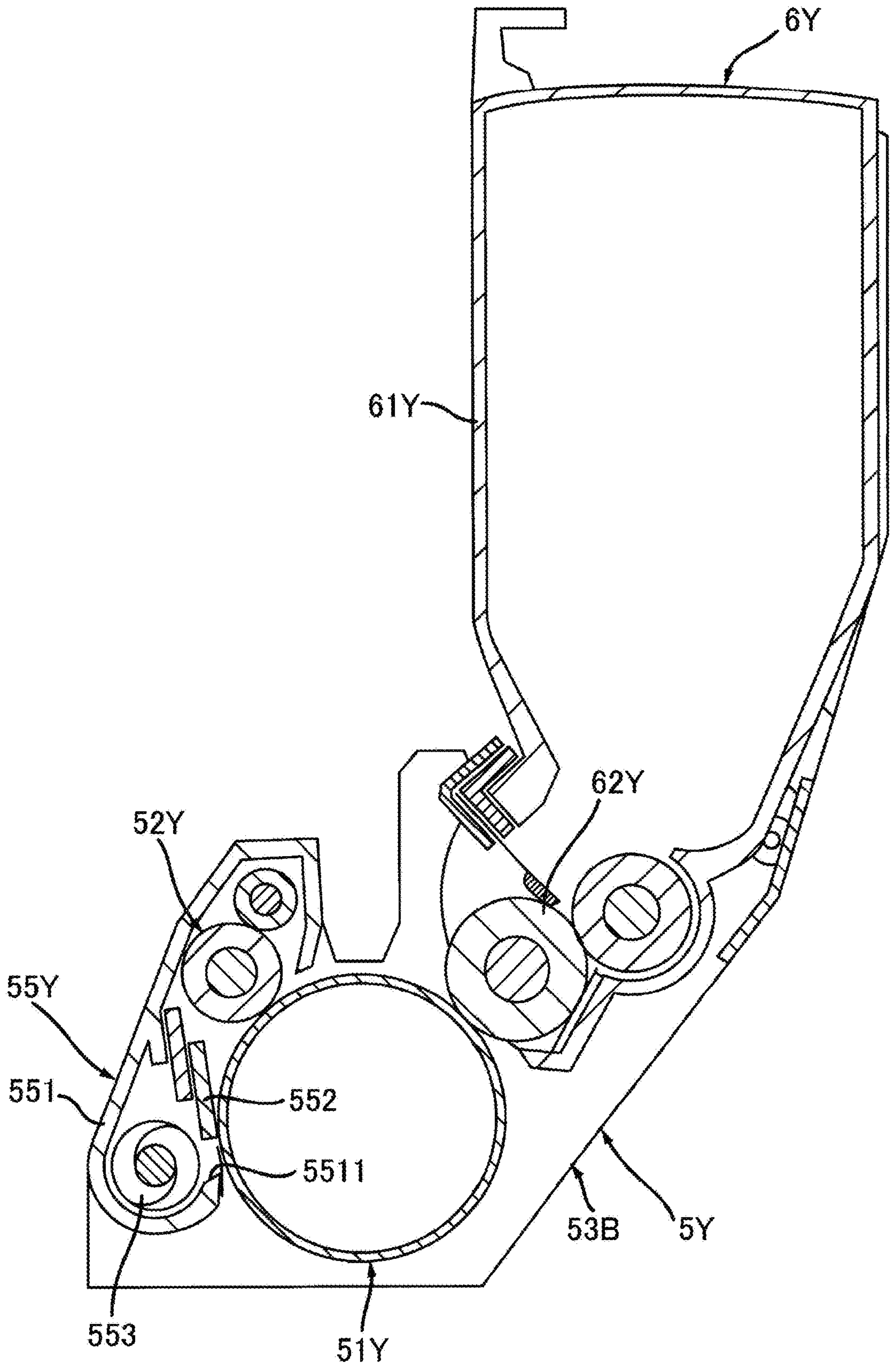
FIG. 4 is a cross-sectional view of the drum cartridge of FIG. 3 taken along a line IV-IV in FIG. 3.

As illustrated in FIG. 3, the drum cartridge 5Y further includes a pair of drum side plates 53A and 53B, a pair of guided portions 54A and 54B, a drum cleaner 55Y, a toner discharging part 56Y, a shutter 57Y, an engaging part 58Y, and a plurality of protrusions 59A, 59B (see FIGS. 5 and 6), in addition to the above-described photosensitive drum 51Y and the charging device 52Y (see FIG. 4).

2.1 Drum Side Plates 53A, 53B

As illustrated in FIG. 3, the drum side plate 53A constitutes one end portion of the drum cartridge 5Y in the first direction. The drum side plate 53A supports one end portion of the photosensitive drum 51Y in the first direction. The drum side plate 53A extends in a third direction. The third direction crosses both the first direction and the second direction. Preferably, the third direction be orthogonal to both the first direction and the second direction.

The drum side plate 53B constitutes another end portion of the drum cartridge 5Y in the first direction. The drum side plate 53B supports another end portion of the photosensitive drum 51Y in the first direction. The drum side plate 53B extends in the third direction.

2.2 Guided Portions 54A and 54B

The guided portion 54A is configured to be guided by a drum guide 111Y (see FIG. 8) that is formed in a housing side plate 11A (see FIG. 8) of the housing 2 for guiding attachment of the drum cartridge 5Y to the housing 2. The housing side plate 11A and the drum guide 111Y will be described later in detail. The guided portion 54A is positioned opposite the drum side plate 53B with respect to the drum side plate 53A in the first direction. The guided portion 54A extends in the first direction. In the present embodiment, the guided portion 54A extends outward in the first direction from the drum side plate 53A. Incidentally, the guided portion 54A may be integral with or attached to the drum side plate 53A. The guided portion 54A has a hollow cylindrical shape. In the present embodiment, the one end portion in the first direction of the photosensitive drum 51Y is fitted in the guided portion 54A.

The guided portion 54B is configured to be guided by another drum guide 111Y that is formed in a housing side plate 11B (see FIG. 7) of the housing 2 for guiding the attachment of the drum cartridge 5Y to the housing 2. The housing side plate 11B will be described later. The guided portion 54B is positioned opposite the drum side plate 53A with respect to the drum side plate 53B in the first direction. The guided portion 54B extends in the first direction. In the present embodiment, the guided portion 54B extends outward in the first direction from the drum side plate 53B. Incidentally, the guided portion 54B may be integral with or attached to the drum side plate 53B. The guided portion 54B has a hollow cylindrical shape. In the present embodiment, the other end portion in the first direction of the photosensitive drum 51Y is fitted in the guided portion 54B.

2.3 Drum Cleaner 55Y

The drum cleaner 55Y is positioned between the drum side plate 53A and the drum side plate 53B in the first direction. The drum cleaner 55Y extends in the first direction. The drum cleaner 55Y has one end portion in the first direction that is connected to the drum side plate 53A. The drum cleaner 55Y has another end portion in the first direction that is connected to the drum side plate 53B. The drum cleaner 55Y is configured to perform cleaning over the peripheral surface of the photosensitive drum 51Y.

As illustrated in FIG. 4, the drum cleaner 55Y includes a cleaner housing 551, a cleaning member 552, and a waste toner conveying member 553.

2.3.1 Cleaner Housing 551

As illustrated in FIG. 3, the cleaner housing 551 is positioned between the drum side plate 53A and the drum side plate 53B in the first direction. The cleaner housing 551 extends in the first direction. The cleaner housing 551 has one end portion in the first direction that is connected to the drum side plate 53A. The cleaner housing 551 has another end portion in the first direction that is connected to the drum side plate 53B. The cleaner housing 551 is configured to store waste toner therein. As illustrated in FIG. 4, the cleaner housing 551 has an opening 5511.

2.3.2 Cleaning Member 552

The cleaning member 552 is attached to the cleaner housing 551. The cleaning member 552 extends in the first direction. The cleaning member 552 has a plate-like shape. The cleaning member 552 has an edge in contact with the peripheral surface of the photosensitive drum 51Y. As the photosensitive drum 51Y rotates, the edge of the cleaning member 552 contacts the waste toner deposited on the peripheral surface of the photosensitive drum 51Y and removes the same from the peripheral surface of the photosensitive drum 51Y. In this way, the cleaning member 552 cleans the peripheral surface of the photosensitive drum 51Y. The waste toner removed by the cleaning member 552 is then stored in the cleaner housing 551 through the opening 5511.

2.3.3 Waste Toner Conveying Member 553

The waste toner conveying member 553 is positioned inside the cleaner housing 551. The waste toner conveying member 553 is configured to convey the waste toner stored inside the cleaner housing 551 in the first direction toward the toner discharging part 56Y (see FIG. 3). In the present embodiment, an auger screw is used as the waste toner conveying member 553. The waste toner conveying member 553 extends in the first direction.

2.4 Toner Discharging Part 56Y

Figure 5:
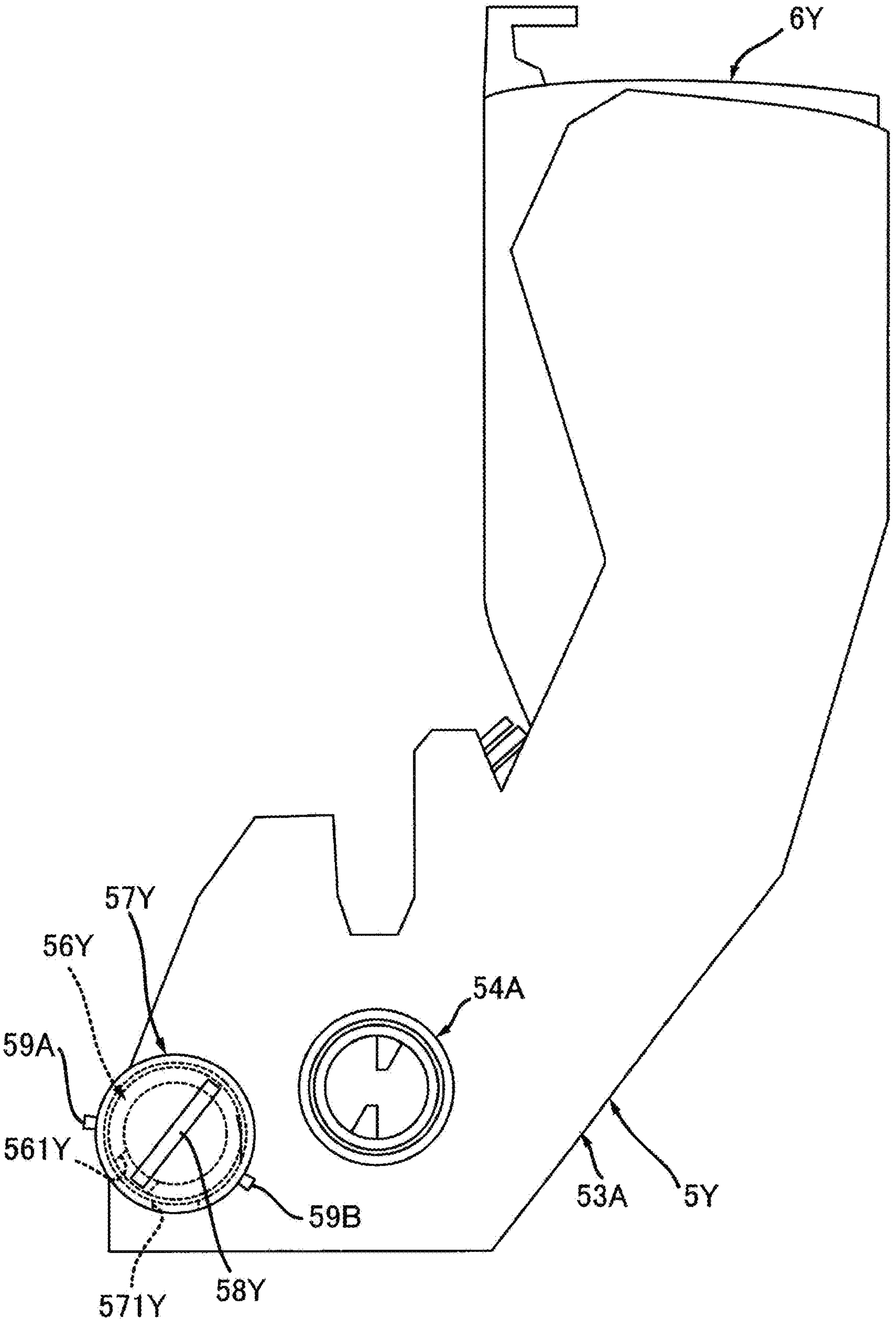
FIG. 5 is a side view of the drum cartridge of FIG. 3 as viewed in a first direction.

As illustrated in FIG. 3, the toner discharging part 56Y is positioned opposite the drum side plate 53B with respect to the drum side plate 53A in the first direction. The toner discharging part 56Y extends outward in the first direction from the drum side plate 53A. The toner discharging part 56Y may be integral with or attached to the drum side plate 53A. As illustrated in FIG. 5, the toner discharging part 56Y has a hollow cylindrical shape. The toner discharging part 56Y has an internal space in communication with an internal space of the cleaner housing 551. The toner discharging part 56Y has a discharge opening 561Y.

The discharge opening 561Y is in communication with the internal space of the toner discharging part 56Y. Through the discharge opening 561Y, the waste toner in the toner discharging part 56Y is allowed to be discharged. Hence, the waste toner collected by the drum cleaner 55Y can be discharged through the discharge opening 561Y.

2.5 Shutter 57Y

As illustrated in FIG. 3, the shutter 57Y is positioned opposite the drum side plate 53B with respect to the drum side plate 53A in the first direction. The shutter 57Y is attached to the toner discharging part 56Y.

Figure 6:
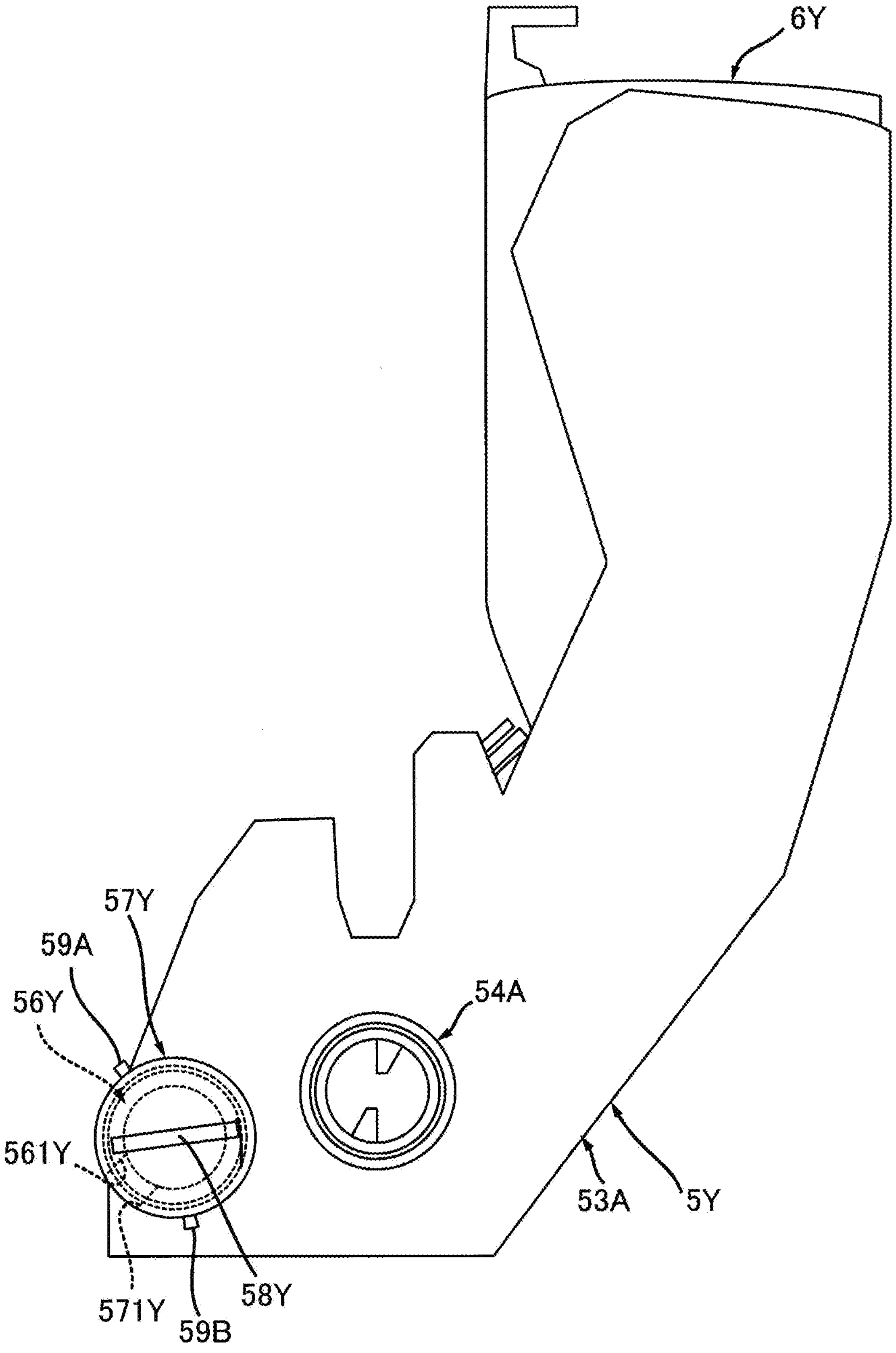
FIG. 6 is a side view of the drum cartridge illustrated in FIG. 5 in a state where a shutter thereof is at its first open position.

As illustrated in FIGS. 5 and 6, the shutter 57Y is configured to open and close the discharge opening 561Y. Specifically, the shutter 57Y is movable between a first shutter closing position (see FIG. 5) and a first shutter open position (see FIG. 6). More specifically, the shutter 57Y is pivotable about the toner discharging part 56Y between the first shutter closing position and the first shutter open position. As illustrated in FIG. 5, the shutter 57Y closes the discharge opening 561Y when the shutter 57Y is at the first shutter closing position. As illustrated in FIG. 6, the discharge opening 561Y is opened when the shutter 57Y is at the first shutter open position.

The shutter 57Y extends in the first direction. The shutter 57Y has a hollow cylindrical shape. The shutter 57Y is movable together with the engaging part 58Y. The shutter 57Y has a shutter opening 571Y.

At least a part of the shutter opening 571Y is in communication with the discharge opening 561Y when the shutter 57Y is at the first shutter open position (see FIG. 6). As such, the discharge opening 561Y is opened in a state where the shutter 57Y is at the first shutter open position.

Incidentally, as illustrated in FIG. 5, the shutter opening 571Y is positioned away from the discharge opening 561Y in a pivoting direction of the shutter 57Y when the shutter 57Y is at the first shutter closing position. As such, the shutter opening 571Y does not communicate with the discharge opening 561Y in a state where the shutter 57Y is at the first shutter closing position.

2.6 Engaging Part 58Y

As illustrated in FIG. 3, the engaging part 58Y is positioned opposite the drum side plate 53A with respect to the shutter 57Y in the first direction. The engaging part 58Y is positioned on an outer surface of the shutter 57Y in the first direction. In the state where the drum cartridge 5Y is attached to the housing 2, the engaging part 58Y engages an engaging member 15Y (see FIG. 8) of the housing 2. The engaging member 15Y will be described later. When engaged with the engaging member 15Y, the engaging part 58Y is rotatable together with the engaging member 15Y.

Specifically, the engaging part 58Y protrudes outward in the first direction from the outer surface in the first direction of the shutter 57Y. As illustrated in FIG. 5, the engaging part 58Y extends in a radial direction of the shutter 57Y. In the state where the drum cartridge 5Y is attached to the housing 2, the engaging part 58Y is fitted in a groove 151Y (see FIG. 8) of the engaging member 15Y. The engaging part 58Y is rotatable together with the engaging member 15Y by the engagement of the engaging part 58Y with the groove 151Y of the engaging member 15Y.

2.7 Protrusions 59A, 59B

The protrusion 59A is positioned on a peripheral surface of the shutter 57Y. The protrusion 59A protrudes outward from the peripheral surface of the shutter 57Y in the radial direction of the shutter 57Y.

The protrusion 59B is positioned apart from the protrusion 59A in the pivoting direction of the shutter 57Y. The protrusion 59B is positioned on the peripheral surface of the shutter 57Y. The protrusion 59B protrudes outward from the peripheral surface of the shutter 57Y in the radial direction of the shutter 57Y.

3. Drum Cartridges 5M, 5C, 5K

As described above, each of the drum cartridges 5M, 5C and 5K has the same structure as the drum cartridge 5Y.

Figure 9:
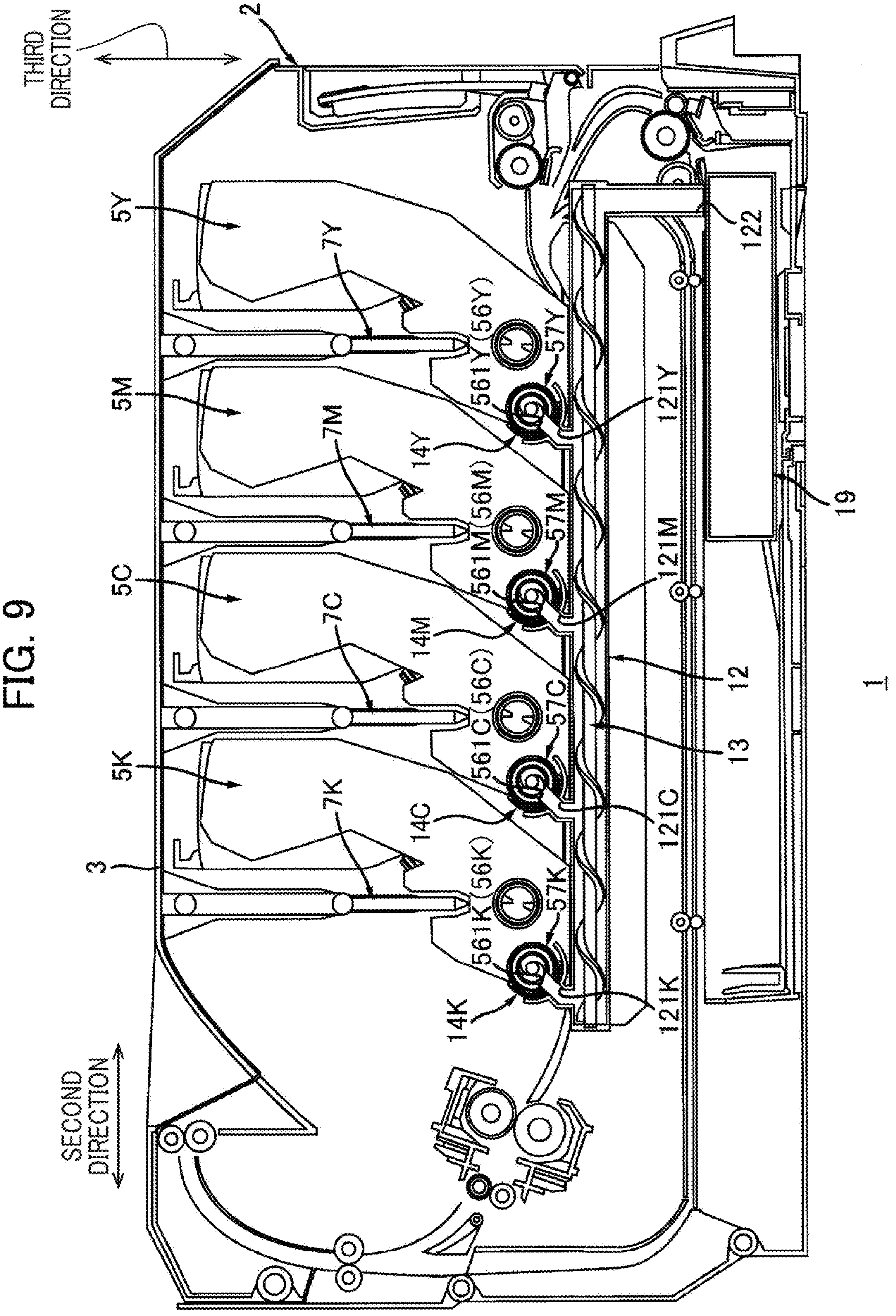
FIG. 9 is a cross-sectional view of the image-forming apparatus of FIG. 7 taken along a line IX-IX in FIG. 7.
Figure 12:
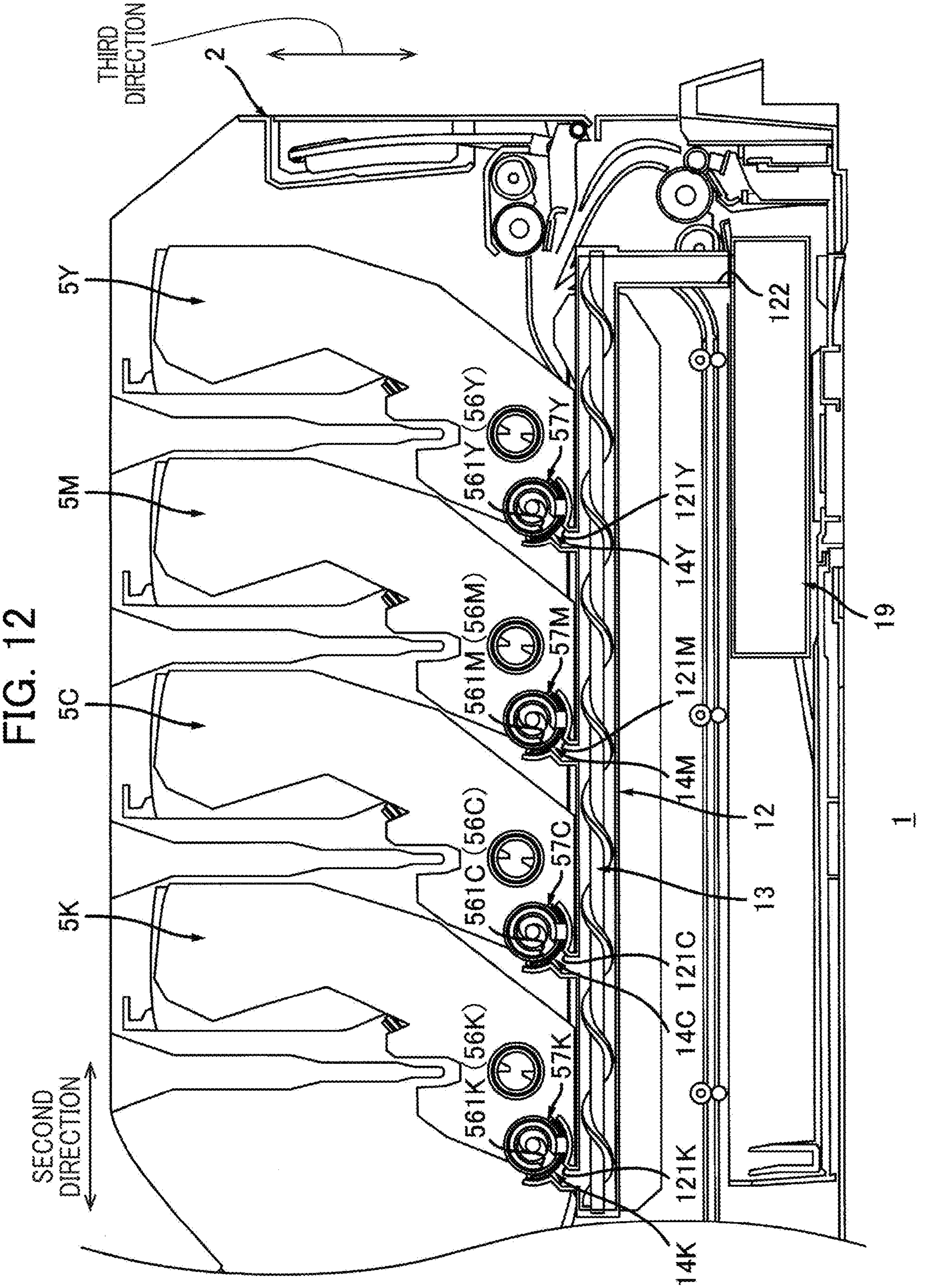
FIG. 12 is a schematic view of the image-forming apparatus illustrated in FIG. 9 in the state where the cover is at its open position.

That is, the drum cartridge 5M includes a drum cleaner 55M, a toner discharging part 56M, and a shutter 57M (see FIGS. 2, 9 and 12). The drum cleaner 55M is configured to clean the peripheral surface of the photosensitive drum 51M. The toner discharging part 56M has a discharge opening 561M (see FIG. 9) through which the waste toner collected by the drum cleaner 55M is allowed to be discharged. The shutter 57M is movable between a second shutter closing position and a second shutter open position. Specifically, the shutter 57M is pivotable about the toner discharging part 56M between the second shutter closing position and the second shutter open position. The shutter 57M closes the discharge opening 561M when the shutter 57M is at the second shutter closing position. The discharge opening 561M is opened when the shutter 57M is at the second shutter open position.

Likewise, the drum cartridge 5C includes a drum cleaner 55C, a toner discharging part 56C, and a shutter 57C (see FIGS. 2, 9 and 12). The toner discharging part 56C has a discharge opening 561C (see FIGS. 9 and 12). The drum cartridge 5K includes a drum cleaner 55K, a toner discharging part 56K, and a shutter 57K (see FIGS. 2, 9 and 12). The toner discharging part 56K has a discharge opening 561K (see FIGS. 9 and 12).

Other details on the configurations of the respective drum cartridges 5M, 5C, and 5K will be omitted herein for simplifying description.

4. Details of Image-Forming Apparatus 1

Referring to FIGS. 7 through 12, the image-forming apparatus 1 will be now described in detail.

Figure 7:
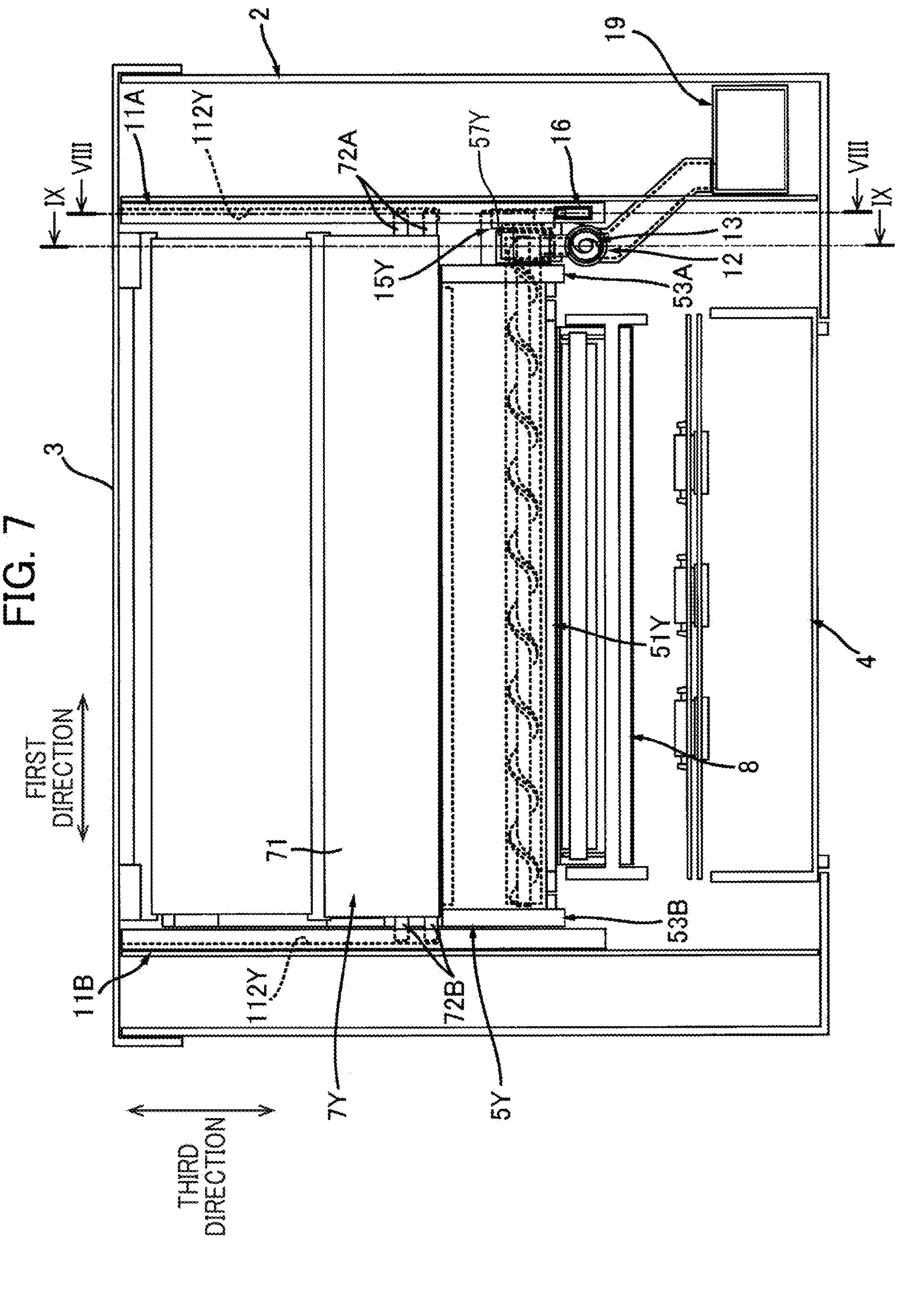
FIG. 7 is a cross-sectional view of the image-forming apparatus illustrated in FIG. 1 taken along a line VII-VII in FIG. 1.

As illustrated in FIG. 7, the image-forming apparatus 1 includes the housing side plates 11A and 11B, a waste toner tube 12, a toner conveying member 13, a plurality of waste toner shutters 14Y, 14M, 14C and 14K (illustrated in FIG. 9), a plurality of engaging members 15Y, 15M, 15C and 15K (illustrated in FIG. 8), a shutter driving member 16, a spring 17 (see FIG. 8), an interlocking mechanism 18 (see FIG. 8), and a waste toner container 19.

4.1 Housing Side Plate 11A

The housing side plate 11A is positioned inside the housing 2. The housing side plate 11A extends in the third direction. In a state where the drum cartridges 5Y, 5M, 5C and 5K are attached to the housing 2, the housing side plate 11A faces, in the first direction, respective one end portions of the drum cartridges 5Y, 5M, 5C and 5K in the first direction.

In the state where the drum cartridge 5Y is attached to the housing 2, the shutter 57Y (see FIG. 3) of the drum cartridge 5Y is positioned between the drum side plate 53A of the drum cartridge 5Y and the housing side plate 11A in the first direction. In a state where the drum cartridge 5M is attached to the housing 2, the shutter 57M of the drum cartridge 5M is positioned between the drum side plate 53A of the drum cartridge 5M and the housing side plate 11A in the first direction. In a state where the drum cartridge 5C is attached to the housing 2, the shutter 57C of the drum cartridge 5C is positioned between the drum side plate 53A of the drum cartridge 5C and the housing side plate 11A in the first direction. In a state where the drum cartridge 5K is attached to the housing 2, the shutter 57K of the drum cartridge 5K is positioned between the drum side plate 53A of the drum cartridge 5K and the housing side plate 11A in the first direction.

Figure 8:
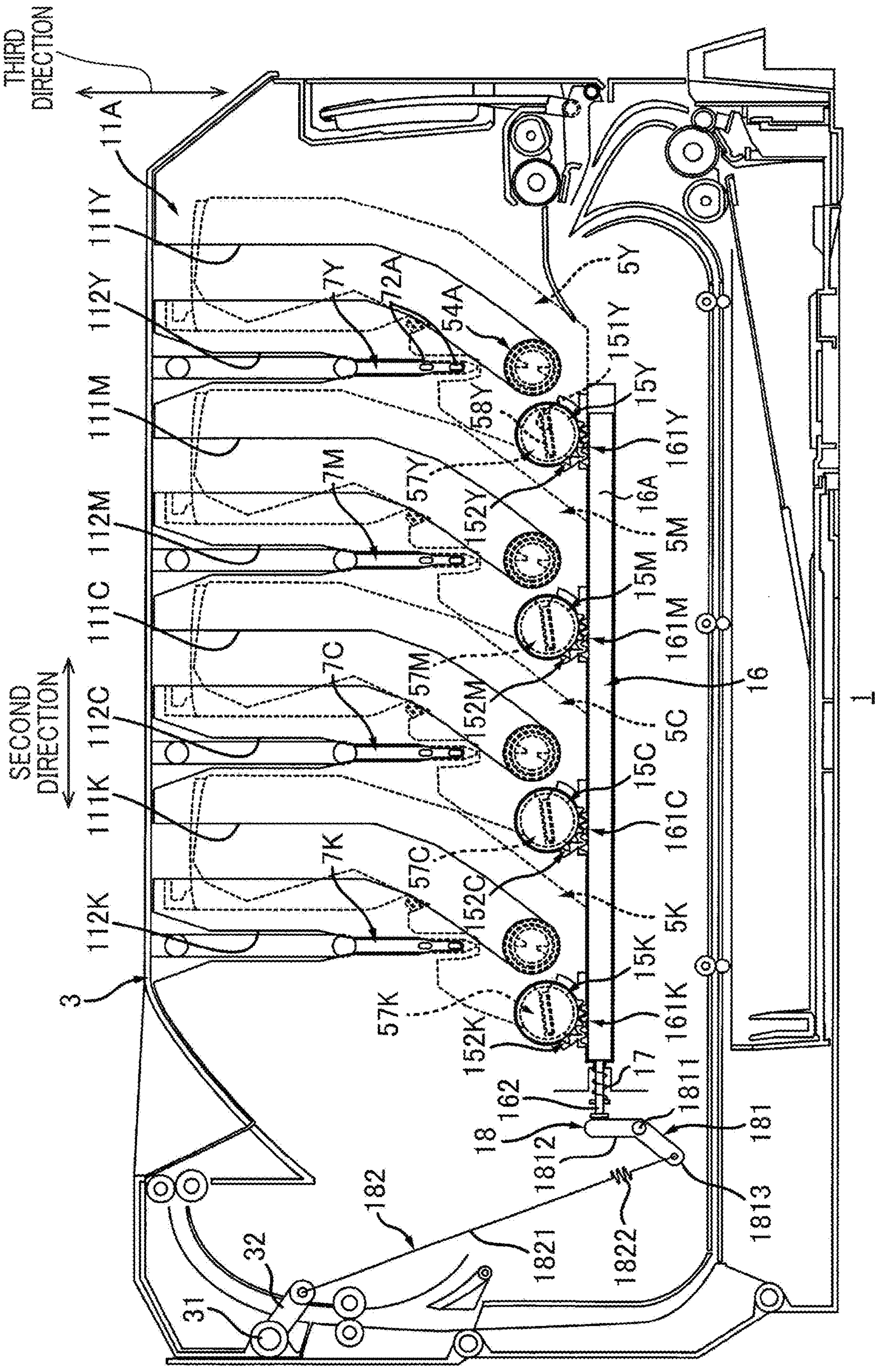
FIG. 8 is a cross-sectional view of the image-forming apparatus of FIG. 7 taken along a line VIII-VIII in FIG. 7.

As illustrated in FIG. 8, the housing side plate 11A has a plurality of drum guides 111Y, 111M, 111C and 111K, and a plurality of guides 112Y, 112M, 112C and 112K. In other words, the image-forming apparatus 1 has the plurality of guides 112Y, 112M, 112C and 112K.

4.1.1 Drum Guides 111Y, 111M, 111C, 111K

During attachment of the drum cartridge 5Y to the housing 2, the guided portion 54A of the drum cartridge 5Y is guided by the drum guide 111Y of the housing side plate 11A. The drum guide 111Y extends in the third direction. In the present embodiment, the drum guide 111Y is in a form of a groove. During the attachment of the drum cartridge 5Y to the housing 2, the guided portion 54A of the drum cartridge 5Y is fitted in the drum guide 111Y of the housing side plate 11A. Incidentally, the drum guide 111Y may be provided in a form of a rib.

The drum guides 111Y, 111M, 111C and 111K are arrayed with one another in the second direction. The drum guides 111M, 111C and 111K can be described in the same manner as the drum guide 111Y. Therefore, the drum guides 111M, 111C and 111K will not be described here for simplifying description.

4.1.2 Guides 112Y, 112M, 112C, 112K

The guide 112Y on the housing side plate 11A is configured to guide one end portion of the exposing head 7Y in the first direction while the cover 3 moves between the cover closed position and the cover open position.

As illustrated in FIG. 7, the exposing head 7Y includes a frame 71, a plurality of protrusions 72A, and a plurality of protrusions 72B.

The frame 71 extends in the first direction. The frame 71 supports LED arrays.

The plurality of protrusions 72A constitutes the one end portion of the exposing head 7Y in the first direction. The plurality of protrusions 72A protrudes outward from one end of the frame 71 in the first direction. The plurality of protrusions 72A may be integral with or attached to the frame 71. Each protrusion 72A extends in the first direction.

The plurality of protrusions 72B constitutes another end portion of the exposing head 7Y in the first direction. The plurality of protrusions 72B protrudes outward from another end of the frame 71 in the first direction. The plurality of protrusions 72B may be integral with or attached to the frame 71. Each protrusion 72B extends in the first direction.

The plurality of protrusions 72A is guided by the guide 112Y of the housing side plate 11A while the cover 3 moves between the cover closed position and the cover open position, as illustrated in FIG. 8. The guide 112Y extend in the third direction. In the present embodiment, the guide 112Y is in a form of a groove. The plurality of protrusions 72A is fitted in the guide 112Y while the cover 3 moves between the cover closed position and the cover open position. Incidentally, the guide 112Y may be provided in a form of a rib.

The guides 112Y, 112M, 112C and 112K are arrayed with one another in the second direction. The description as to the guide 112Y is also applicable to the guides 112M, 112C and 112K. That is, the plurality of protrusions 72A constituting the one end portion in the first direction of the exposing head 7M is guided by the guide 112M of the housing side plate 11A while the cover 3 moves between the cover closed position and the cover open position. Further descriptions as to the guides 112C and 112K will be omitted here for simplifying description.

4.2 Housing Side Plate 11B

As illustrated in FIG. 7, the housing side plate 11B is positioned inside the housing 2. The housing side plate 11B is positioned apart from the housing side plate 11A in the first direction. The housing side plate 11B is positioned opposite the housing side plate 11A in the first direction with respect to the exposing head 7Y. The housing side plate 11B extends in the third direction. In the state where the drum cartridges 5Y, 5M, 5C and 5K are attached to the housing 2, the housing side plate 11B faces, in the first direction, respective another end portions of the drum cartridges 5Y, 5M, 5C and 5K in the first direction.

The housing side plate 11B can be described in the same manner as the housing side plate 11A. That is, the housing side plate 11B also has the plurality of drum guides 111Y, 111M, 111C and 111K, and the plurality of guides 112Y, 112M, 112C and 112K. During the attachment of the drum cartridge 5Y to the housing 2, the guided portion 54B (see FIG. 3) of the drum cartridge 5Y is guided by the drum guide 111Y of the housing side plate 11B. The plurality of protrusions 72B constituting the other end portion in the first direction of the exposing head 7Y is guided by the guide 112Y of the housing side plate 11B while the cover 3 moves between the cover closed position and the cover open position.

Likewise, the plurality of protrusions 72B constituting the other end portion in the first direction of the exposing head 7M is guided by the guide 112M of the housing side plate 11B while the cover 3 moves between the cover closed position and the cover open position. Further descriptions as to the guides 112C and 112K on the housing side plate 11B will be omitted here for simplifying description.

4.3 Waste Toner Tube 12

The waste toner tube 12 is positioned between the housing side plate 11A and the housing side plate 11B in the first direction. The waste toner tube 12 is positioned between the housing side plate 11A and the transferring device 8 in the first direction. As illustrated in FIG. 9, the waste toner tube 12 extends in the second direction. The waste toner is allowed to be conveyed inside the waste toner tube 12 therealong.

The waste toner tube 12 has a plurality of waste toner inlet openings 121Y, 121M, 121C and 121K, and a waste toner outlet opening 122.

The waste toner inlet openings 121Y, 121M, 121C and 121K are arrayed with one another in the second direction. In the state where the drum cartridge 5Y is attached to the housing 2, the waste toner discharged from the discharge opening 561Y is allowed to be introduced into the waste toner tube 12 through the waste toner inlet opening 121Y. In the state where the drum cartridge 5M is attached to the housing 2, the waste toner discharged from the discharge opening 561M is allowed to be introduced into the waste toner tube 12 through the waste toner inlet opening 121M. In the state where the drum cartridge 5C is attached to the housing 2, the waste toner discharged from the discharge opening 561C is allowed to be introduced into the waste toner tube 12 through the waste toner inlet opening 121C. In the state where the drum cartridge 5K is attached to the housing 2, the waste toner discharged from the discharge opening 561K is allowed to be introduced into the waste toner tube 12 through the waste toner inlet opening 121K.

The waste toner outlet opening 122 is configured to allow the waste toner in the waste toner tube 12 to be discharged through the waste toner outlet opening 122. The waste toner outlet opening 122 is positioned at one end portion of the waste toner tube 12 in the second direction (i.e., at the lower end of the waste toner tube 12 in FIG. 9). Finally, the waste toner discharged through the waste toner outlet opening 122 is stored in the waste toner container 19.

4.4 Toner Conveying Member 13

The toner conveying member 13 is positioned inside the waste toner tube 12. The toner conveying member 13 is configured to convey the waste toner in the waste toner tube 12 toward the waste toner outlet opening 122. In the present embodiment, an auger screw is used as the toner conveying member 13. The toner conveying member 13 extends in the second direction.

4.5 Waste Toner Shutters 14Y, 14M, 14C, 14K

Figure 10B:
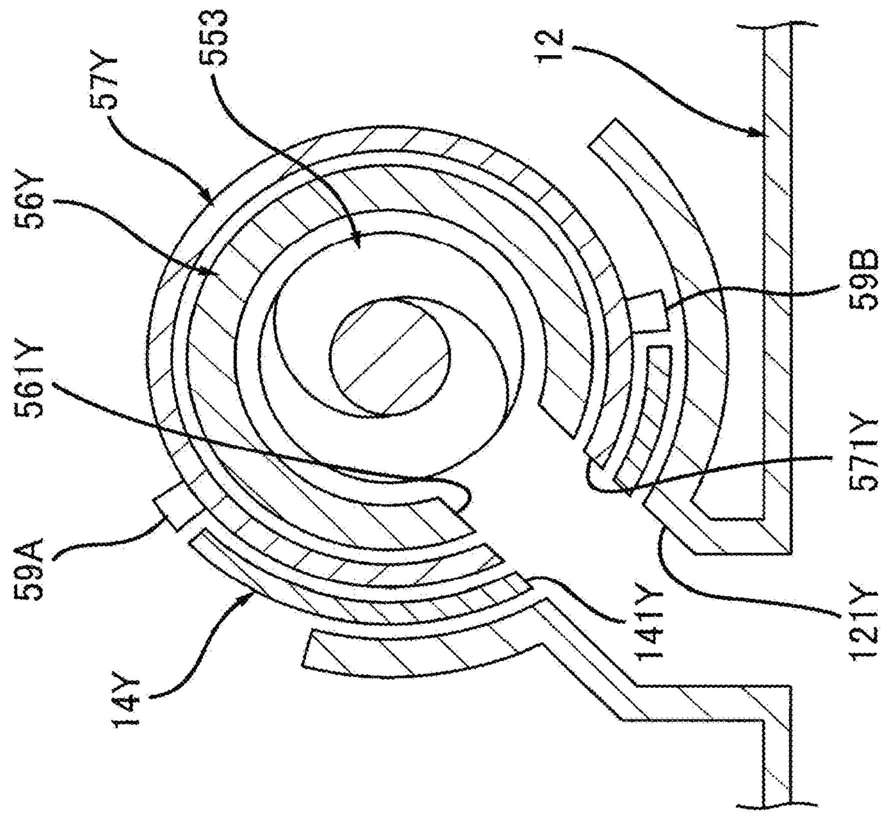
FIG. 10B is an enlarged cross-sectional view of the shutter and the waste toner shutter illustrated in FIG. 9 in a state where the shutter is at its first shutter open position and the waste toner shutter is at its first waste-toner-shutter open position.
Figure 10A:
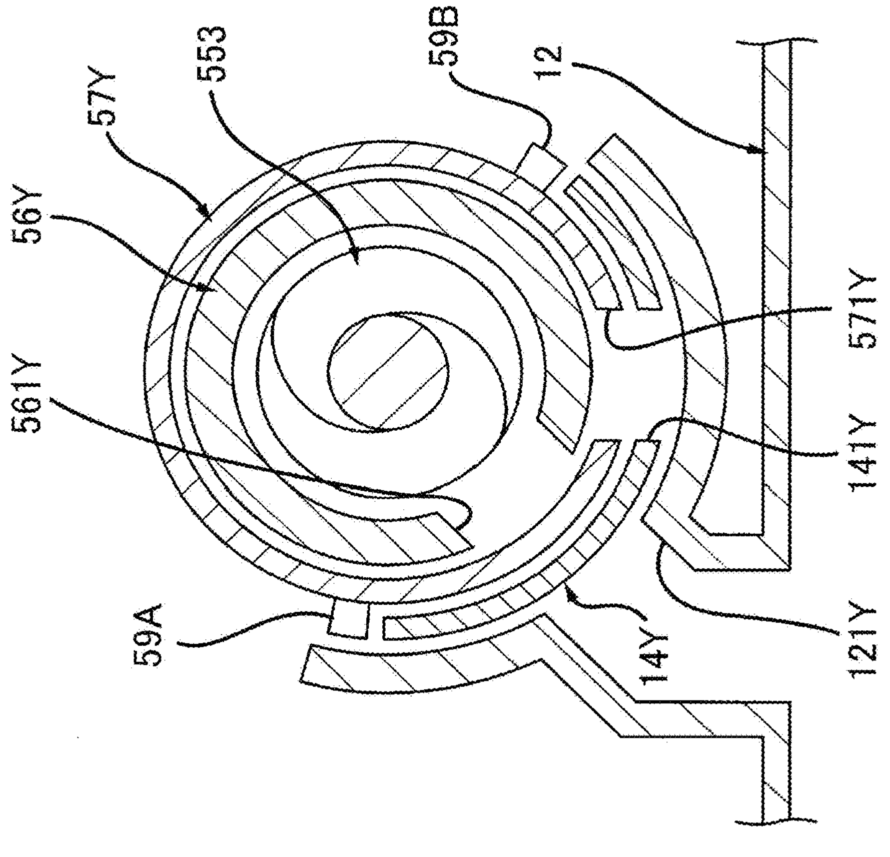
FIG. 10A is an enlarged cross-sectional view of the shutter and a waste toner shutter illustrated in FIG. 9 in a state where the shutter is at its first shutter closing position and the waste toner shutter is at its first waste toner shutter closing position.

As illustrated in FIGS. 10A and 10B, the waste toner shutter 14Y has an arcuate shape in a side view. The waste toner shutter 14Y has a shutter opening 141Y. As illustrated in FIG. 10A, in the state where the drum cartridge 5Y is attached to the housing 2, the waste toner shutter 14Y extends along a peripheral surface of the shutter 57Y of the drum cartridge 5Y. In the state where the drum cartridge 5Y is attached to the housing 2, the waste toner shutter 14Y is positioned between the protrusion 59A and the protrusion 59B in the pivoting direction of the shutter 57Y.

The waste toner shutter 14Y is movable between a first waste toner shutter closing position (FIG. 10A) and a first waste toner shutter open position (FIG. 10B). Specifically, the waste toner shutter 14Y is pivotable (angularly rotatable) between the first waste toner shutter closing position (FIG. 10A) and the first waste toner shutter open position (FIG. 10B). As illustrated in FIG. 10A, the waste toner shutter 14Y closes the waste toner inlet opening 121Y in a state where the waste toner shutter 14Y is at the first waste toner shutter closing position. As illustrated in FIG. 10B, the waste toner inlet opening 121Y is opened through the shutter opening 141Y in a state where the waste toner shutter 14Y is at the first waste toner shutter open position.

In response to movement of the shutter 57Y from the first shutter closing position (FIG. 10A) to the first shutter open position (FIG. 10B), the waste toner shutter 14Y is pushed by the protrusion 59B so that the waste toner shutter 14Y moves from the first waste toner shutter closing position (FIG. 10A) to the first waste toner shutter open position (FIG. 10B).

On the other hand, in response to movement of the shutter 57Y from the first shutter open position (FIG. 10B) to the first shutter closing position (FIG. 10A), the waste toner shutter 14Y is pushed by the protrusion 59A so that the waste toner shutter 14Y moves from the first waste toner shutter open position (FIG. 10B) to the first waste toner shutter closing position (FIG. 10A).

Each of the waste toner shutters 14M, 14C and 14K has the same structure as the waste toner shutter 14Y. Hence, the waste toner shutters 14M, 14C and 14K can move in the same manner as the waste toner shutter 14Y.

That is, the waste toner shutter 14M is movable between a second waste toner shutter closing position (see FIG. 12) and a second waste toner shutter open position (see FIG. 9). As illustrated in FIG. 12, the waste toner shutter 14M closes the waste toner inlet opening 121M in a state where the waste toner shutter 14M is at the second waste toner shutter closing position. The waste toner inlet opening 121M is opened in a state where the waste toner shutter 14M is at the second waste toner shutter open position. Further descriptions as to movements of the waste toner shutters 14M, 14C and 14K will be omitted here for simplifying description.

4.6 Engaging Members 15Y, 15M, 15C, 15K

As illustrated in FIG. 7, the engaging member 15Y is mounted on the housing side plate 11A. In the state where the drum cartridge 5Y is attached to the housing 2, the engaging member 15Y is positioned between the shutter 57Y of the drum cartridge 5Y and the housing side plate 11A in the first direction. As illustrated in FIG. 8, the engaging member 15Y has a disc-like shape in a side view. The engaging member 15Y is pivotable relative to the housing side plate 11A. The engaging member 15Y has the groove 151Y, and includes a gear 152Y.

The groove 151Y extends in a radial direction of the engaging member 15Y. In the state where the drum cartridge 5Y is attached to the housing 2, the engaging part 58Y (FIG. 5) of the drum cartridge 5Y is fitted in the groove 151Y. That is, the engaging member 15Y engages the shutter 57Y through the engaging part 58Y in the state where the drum cartridge 5Y is attached to the housing 2. The engaging member 15Y is pivotable together with the shutter 57Y of the drum cartridge 5Y due to the fitting engagement between the engaging part 58Y and the groove 151Y. That is, the engaging member 15Y is pivotable together with the shutter 57Y while the engaging member 15Y is engaged with the shutter 57Y.

The gear 152Y has a plurality of gear teeth. The plurality of gear teeth is arrayed in a circumferential direction of the engaging member 15Y.

Figure 11:
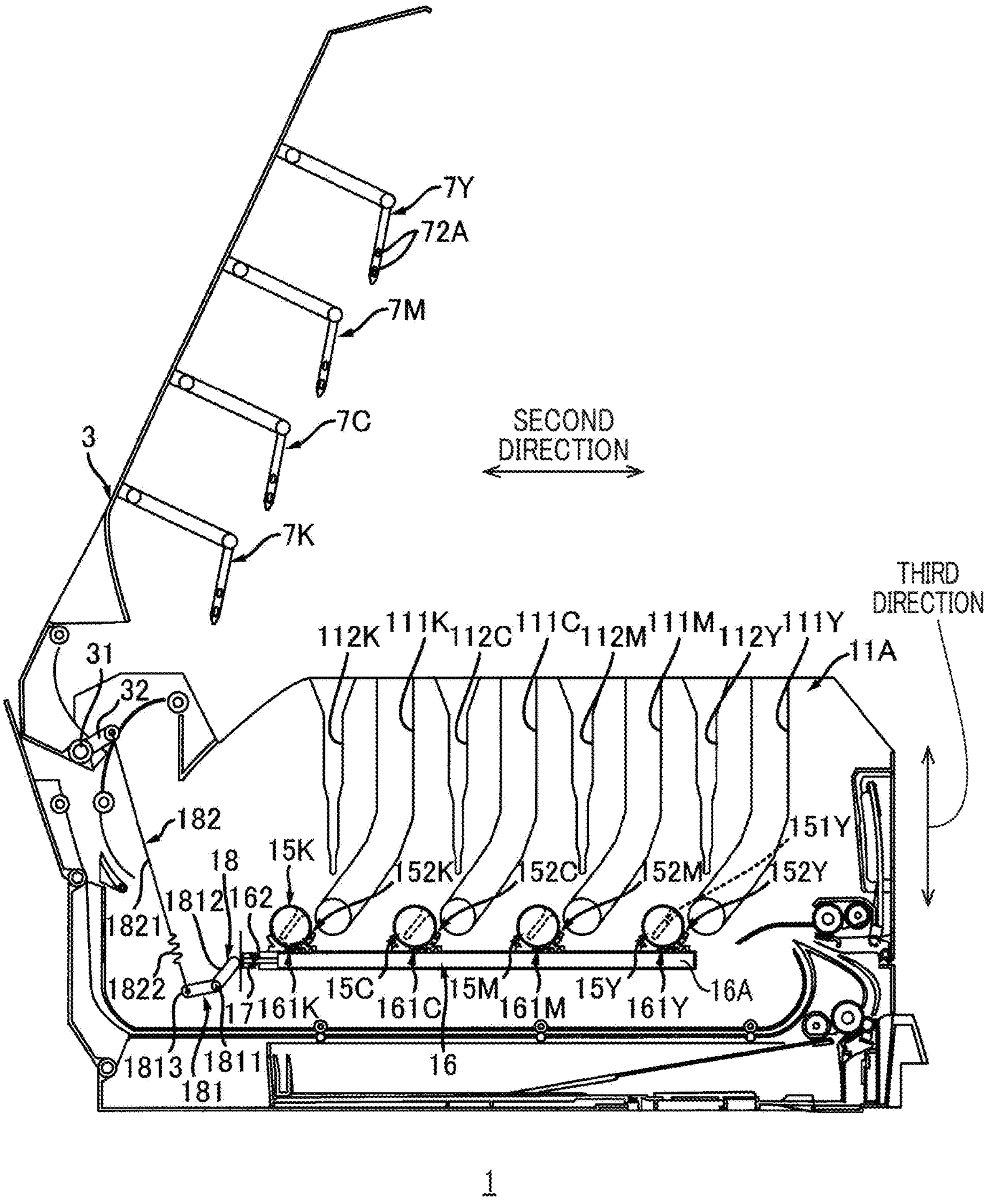
FIG. 11 is a schematic view of the image-forming apparatus illustrated in FIG. 8 in a state where the cover is at its open position.

Incidentally, the engaging member 15Y also functions as a drum locking member configured to lock the position of the drum cartridge 5Y inside the housing 2. As illustrated in FIGS. 8 and 11, the engaging member 15Y is pivotable (angularly rotatable) between a first locking position (FIG. 8) and a first unlocking position (FIG. 11). As illustrated in FIG. 8, in a state where the engaging member 15Y is at the first locking position, the engaging member 15Y locks the drum cartridge 5Y in position relative to the housing 2 therein. As illustrated in FIG. 11, in a state where the engaging member 15Y is at the first unlocking position, the engaging member 15Y unlocks the drum cartridge 5Y relative to the housing 2.

Each of the engaging members 15M, 15C and 15K has the same structure as the engaging member 15Y. Hence, the engaging members 15M, 15C, 15K can move in the same manner as the engaging member 15Y.

That is, the engaging member 15M engages the shutter 57M of the drum cartridge 5M in the state where the drum cartridge 5M is attached to the housing 2. The engaging member 15M is pivotable together with the shutter 57M while the engaging member 15M is engaged with the shutter 57M. The engaging member 15M includes a gear 152M (see FIG. 8).

Likewise, the engaging member 15C engages the shutter 57C of the drum cartridge 5C in the state where the drum cartridge 5C is attached to the housing 2. The engaging member 15C is pivotable together with the shutter 57C while the engaging member 15C is engaged with the shutter 57C. The engaging member 15C includes a gear 152C (see FIG. 8). The engaging member 15K engages the shutter 57K of the drum cartridge 5K in the state where the drum cartridge 5K is attached to the housing 2. The engaging member 15K is pivotable together with the shutter 57K while the engaging member 15K is engaged with the shutter 57K. The engaging member 15K includes a gear 152K (see FIG. 8).

4.7 Shutter Driving Member 16

As illustrated in FIG. 7, the shutter driving member 16 is supported by the housing side plate 11A. In the present embodiment, the shutter driving member 16 is positioned in an interior of the housing side plate 11A. In the third direction, the shutter driving member 16 is overlapped with at least one of the guides 112Y, 112M, 112C and 112K. In the present embodiment, as illustrated in FIG. 8, the shutter driving member 16 is overlapped with the guides 112M, 112C and 112K, but is not overlapped with the guide 112Y in the third direction. Incidentally, the shutter driving member 16 may be overlapped with all of the guides 112Y, 112M, 112C and 112K in the third direction. In a state where the drum cartridge 5Y is attached to the housing 2 and the cover 3 is at the cover closed position, the shutter driving member 16 is positioned opposite the exposing head 7Y with respect to the photosensitive drum 51Y in the third direction.

The shutter driving member 16 extends in the second direction. As illustrated in FIGS. 8 and 11, the shutter driving member 16 is movable in the second direction between a first position (FIG. 8) and a second position (FIG. 11) relative to the waste toner tube 12 (FIG. 9). As illustrated in FIG. 8, the shutter driving member 16 is at the first position in the state where the cover 3 is at the cover closed position. As illustrated in FIG. 11, the shutter driving member 16 is at the second position in the state where the cover 3 is at the cover open position.

As illustrated in FIG. 8, the shutter driving member 16 includes a body part 16A extending in the second direction, a plurality of rack parts 161Y, 161M, 161C and 161K, and a force receiving part 162.

The rack parts 161Y, 161M, 161C and 161K are provided on the body part 16A such that the rack parts 161Y, 161M, 161C and 161K are arrayed with one another in the second direction. The rack part 161Y is in meshing engagement with the gear 152Y. The rack part 161Y has a plurality of gear teeth. The gear teeth of the rack part 161Y are aligned to extend in the second direction. The rack part 161M is in meshing engagement with the gear 152M. The rack part 161M has a plurality of gear teeth. The gear teeth of the rack part 161M are aligned to extend in the second direction. The rack part 161C is in meshing engagement with the gear 152C. The rack part 161C has a plurality of gear teeth. The gear teeth of the rack part 161C are aligned to extend in the second direction. The rack part 161K is in meshing engagement with the gear 152K. The rack part 161K has a plurality of gear teeth. The gear teeth of the rack part 161K are aligned to extend in the second direction.

The shutter driving member 16 is configured to drive the respective engaging members 15Y, 15M, 15C and 15K because of the meshing engagement between the rack part 161Y and the gear 152Y, between the rack part 161M and the gear 152M, between the rack part 161C and the gear 152C, and between the rack part 161K and the gear 152K. As such, the shutter driving member 16 is movable in interlocking relation to the shutters 57Y, 57M, 57C and 57K through the engaging members 15Y, 15M, 15C and 15K, respectively, in the state where the drum cartridges 5Y, 5M, 5C and 5K are attached to the housing 2.

Specifically, as illustrated in FIGS. 8 and 9, in the state where the drum cartridges 5Y, 5M, 5C and 5K are attached to the housing 2 and the cover 3 is at the cover closed position, the shutter driving member 16 is at the first position and the shutters 57Y, 57M, 57C and 57K are respectively at the first shutter open position, at the second shutter open position, at a third shutter open position, and at a fourth shutter open position.

Further, as illustrated in FIGS. 11 and 12, in a state where the drum cartridges 5Y, 5M, 5C and 5K are attached to the housing 2 and the cover 3 is at the cover open position, the shutter driving member 16 is at the second position and the shutters 57Y, 57M, 57C and 57K are respectively at the first shutter closing position, at the second shutter closing position, at a third shutter closing position, and at a fourth shutter closing position.

As illustrated in FIG. 8, the force receiving part 162 is positioned at an upstream end of the body part 16A in a direction in which the shutter driving member 16 moves from the first position to the second position (i.e., toward the right in FIG. 8). The force receiving part 162 extends outward from the upstream end of the body part 16A in the second direction.

4.8 Spring 17

As illustrated in FIGS. 8 and 11, the spring 17 is configured to urge the shutter driving member 16 in the second direction toward the first position (FIG. 8), i.e., in a direction in which the shutter driving member 16 moves toward the first position (FIG. 8) from the second position (FIG. 11).

4.9 Interlocking Mechanism 18

As illustrated in FIGS. 8 and 11, the interlocking mechanism 18 is configured to provide interlocking movements between the cover 3 and the shutter driving member 16.

Specifically, the interlocking mechanism 18 is configured to press the shutter driving member 16 at the first position (see FIG. 8) toward the second position (see FIG. 11) in interlocking relation to the movement of the cover 3 from the cover closed position (FIG. 8) to the cover open position (FIG. 11).

On the other hand, the interlocking mechanism 18 is configured to stop pressing the shutter driving mechanism 16 at the second position (see FIG. 11) in interlocking relation to the movement of the cover 3 from the cover open position (FIG. 11) to the cover closed position (FIG. 8).

The interlocking mechanism 18 includes a lever 181 and a connecting member 182.

4.9.1 Lever 181

The lever 181 is positioned inside the housing 2. The lever 181 is pivotally movable between a lever first position (illustrated in FIG. 8) and a lever second position (illustrated in FIG. 11). As illustrated in FIG. 8, the lever 181 enables the shutter driving member 16 to be located at the first position when the lever 181 is at the lever first position. As illustrated in FIG. 11, the lever 181 enables the shutter driving member 16 to be located at the second position when the lever 181 is at the lever second position.

The lever 181 includes a shaft 1811, a first arm part 1812, and a second arm part 1813.

The shaft 1811 extends in the first direction. The shaft 1811 has a solid columnar shape. The lever 181 is pivotally movable about an axis of the shaft 1811.

The first arm part 1812 extends from the shaft 1811. Specifically, the first arm part 1812 extends in a direction crossing the first direction. Preferably, the first arm part 1812 extend in a direction orthogonal to the first direction. A tip end portion of the first arm part 1812 faces the force receiving part 162 of the shutter driving member 16 in a state where the lever 181 is at the lever first position.

The second arm part 1813 is positioned apart from the first arm part 1812 in a pivoting direction of the lever 181. The second arm part 1813 extends from the shaft 1811. Specifically, the second arm part 1813 extends in a direction crossing the first direction. Preferably, the second arm part 1813 extend in a direction orthogonal to the first direction. The first arm part 1812 and the second arm part 1813 extend from the shaft 1811 respectively in directions different from each other.

4.9.2 Connecting Member 182

The connecting member 182 connects the cover 3 to the lever 181. The connecting member 182 has one end connected to the cover 3. Specifically, as illustrated in FIG. 8, the one end of the connecting member 182 is connected to an arm 32 of a hinge 31 provided at the cover 3. The connecting member 182 has another end connected to the second arm part 1813 of the lever 181.

The connecting member 182 includes a wire 1821 and a spring 1822. The spring 1822 is connected to the wire 1821.

As illustrated in FIGS. 8 and 11, the connecting member 182 is pulled by the cover 3 in association with the pivoting movement of the cover 3 from the cover closed position to the cover open position. As a result, due to a tensile force of the connecting member 182, the second arm part 1813 of the lever 181 is pulled by the connecting member 182, thereby pivotally moving the lever 181 from the lever first position (FIG. 8) to the lever second position (FIG. 11). Due to the pivotal movement of the lever 181 from the lever first position to the lever second position, the shutter driving member 16 at the first position is moved to the second position against an urging force of the spring 17. That is, in a process to move the cover 3 from the cover closed position to the cover open position, the lever 181 applies pressure on the shutter driving member 16 at the first position to move the shutter driving member 16 toward the second position against the urging force of the spring 17.

On the other hand, as illustrated in FIGS. 11 and 8, in response to the pivotal movement of the cover 3 from the cover open position to the cover closed position, the tensile force applied to the connecting member 182 from the cover 3 is released. Hence, the tensile force applied to the second arm part 1813 of the lever 181 from the connecting member 182 is also released. As such, the lever 181 releases the pressure on the shutter driving member 16. That is, in a process to move the cover 3 from the cover open position to the cover closed position, the lever 181 releases the pressure on the shutter driving member 16. Upon release of the pressure on the shutter driving member 16 from the lever 181, the shutter driving member 16 is moved from the second position to the first position by the urging force of the spring 17.

5. Operational and Technical Advantages (1) According to the image-forming apparatus 1, the shutters 57Y, 57M, 57C and 57K can be opened and closed in interlocking relation to the opening/closing movement of the cover 3, as illustrated in FIGS. 9 and 12.

With this configuration, in the state where the drum cartridges 5Y, 5M, 5C and 5K are attached to the housing 2 and the cover 3 is at the cover closed position, the shutter 57Y can be located at the first shutter open position, the shutter 57M can be located at the second shutter open position, the shutter 57C can be located at the third shutter open position, and the shutter 57K can be located at the fourth shutter open position.

Accordingly, the waste toner from each of the drum cartridges 5Y, 5M, 5C and 5K can be conveyed by the waste toner tube 12 to the waste toner container 19.

Further, in the state where the cover 3 is at the cover open position, the shutter 57Y can be located at the first shutter closing position, the shutter 57M can be located at the second shutter closing position, the shutter 57C can be located at the third shutter closing position, and the shutter 57K can be located at the fourth shutter closing position.

Hence, upon detachment of the drum cartridges 5Y, 5M, 5C and 5K from the housing 2, leakage of the waste toner from the respective drum cartridges 5Y, 5M, 5C and 5K can be restrained.

Further, the shutter driving member 16 is overlapped with at least one of the guides 112Y, 112M, 112C and 112K in the third direction. Hence, the image-forming apparatus 1 can be downsized in the first direction.

(2) According to the image-forming apparatus 1, the shutter driving member 16 can be moved back to the first position from the second position by the urging force of the spring 17, as illustrated in FIGS. 8 and 11.

With this configuration, in conjunction with the user's operation to move the cover 3 to the cover closed position when the drum cartridges 5Y, 5M, 5C and 5K are attached to the housing 2, the shutters 57Y, 57M, 57C and 57K can be moved to the first shutter open position, the second shutter open position, the third shutter open position, and the fourth shutter open position, respectively, without user's operations to the respective shutters 57Y, 57M, 57C and 57K.

Accordingly, the user is not required to perform operations to open the respective shutters 57Y, 57M, 57C and 57K upon attachment/detachment of the drum cartridges 5Y, 5M, 5C and 5K relative to the housing 2, thereby improving user's operability.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image-forming apparatus comprising:

a housing having an opening;

a cover movable between a cover closed position and a cover open position relative to the housing, the cover closing the opening when the cover is at the cover closed position, the cover opening the opening when the cover is at the cover open position;

a first drum cartridge attachable to the housing through the opening when the cover is at the cover open position, the first drum cartridge comprising:

a first photosensitive drum rotatable about a first axis, the first axis extending in a first direction in a state where the first drum cartridge is attached to the housing;

a first drum cleaner configured to collect waste toner on a peripheral surface of the first photosensitive drum;

a first discharging part having a first discharge opening through which the waste toner collected by the first drum cleaner is configured to be discharged; and a first shutter movable between a first-shutter closing position and a first-shutter open position relative to the first discharging part, the first shutter closing the first discharge opening when the first shutter is at the first-shutter closing position, the first shutter opening the first discharge opening when the first shutter is at the first-shutter open position;

a second drum cartridge attachable to the housing through the opening when the cover is at the cover open position, the second drum cartridge comprising:

a second photosensitive drum rotatable about a second axis, the second axis extending in the first direction in a state where the second drum cartridge is attached to the housing;

a second drum cleaner configured to collect waste toner on a peripheral surface of the second photosensitive drum;

a second discharging part having a second discharge opening through which the waste toner collected by the second drum cleaner is configured to be discharged; and a second shutter movable between a second-shutter closing position and a second-shutter open position relative to the second discharging part, the second shutter closing the second discharge opening when the second shutter is at the second-shutter closing position, the second shutter opening the second discharge opening when the second shutter is at the second-shutter open position;

a first exposing head mounted on the cover, the first exposing head being configured to expose the peripheral surface of the first photosensitive drum to light when the cover is at the cover closed position;

a second exposing head mounted on the cover, the second exposing head being configured to expose the peripheral surface of the second photosensitive drum to light when the cover is at the cover closed position;

a first guide configured to guide one end portion of the first exposing head in the first direction while the cover moves between the cover closed position and the cover open position;

a second guide configured to guide one end portion of the second exposing head in the first direction while the cover moves between the cover closed position and the cover open position;

a waste toner tube having a first waste toner inlet opening and a second waste toner inlet opening, the waste toner discharged through the first discharge opening being introduced into an interior of the waste toner tube through the first waste toner inlet opening in the state where the first drum cartridge is attached to the housing, the waste toner discharged through the second discharge opening being introduced into the interior of the waste toner tube through the second waste toner inlet opening in the state where the second drum cartridge is attached to the housing;

a shutter driving member movable in interlocking relation to movements of the first shutter and the second shutter in a state where both the first drum cartridge and the second drum cartridge are attached to the housing, the shutter driving member being movable in a second direction crossing the first direction between a first position and a second position relative to the waste toner tube; and an interlocking mechanism connecting the cover to the shutter driving member to move the cover and the shutter driving member in interlocking relation to each other, wherein the shutter driving member is overlapped with at least one of the first guide and the second guide in a third direction crossing both the first direction and the second direction.

2. The image-forming apparatus according to claim 1, wherein the shutter driving member is positioned opposite the first exposing head with respect to the first photosensitive drum in the third direction in a state where both the first drum cartridge and the second drum cartridge are attached to the housing and the cover is at the cover closed position.

3. The image-forming apparatus according to claim 1, wherein, in a state where both the first drum cartridge and the second drum cartridge are attached to the housing and the cover is at the cover closed position, the shutter driving member is at the first position, and the first shutter is at the first-shutter open position and the second shutter is at the second-shutter open position, and wherein, in a state where both the first drum cartridge and the second drum cartridge are attached to the housing and the cover is at the cover open position, the shutter driving member is at the second position, and the first shutter is at the first-shutter closing position and the second shutter is at the second-shutter closing position.

4. The image-forming apparatus according to claim 3, further comprising a first spring configured to urge the shutter driving member at the second position toward the first position.

5. The image-forming apparatus according to claim 4, wherein the interlocking mechanism comprises:

a lever configured to apply pressure to the shutter driving member at the first position to move the shutter driving member toward the second position against an urging force of the first spring in conjunction with movement of the cover from the cover closed position to the cover open position, the lever being configured to release the pressure to the shutter driving member in conjunction with movement of the cover from the cover open position to the cover closed position; and a connecting member connecting the cover to the lever.

6. The image-forming apparatus according to claim 5, wherein the connecting member includes a wire and a second spring connected to the wire.

7. The image-forming apparatus according to claim 1, further comprising:

a first engaging member engageable with the first shutter in the state where the first drum cartridge is attached to the housing, the first engaging member including a first gear; and a second engaging member engageable with the second shutter in the state where the second drum cartridge is attached to the housing, the second engaging member including a second gear, wherein the first shutter is pivotable between the first-shutter closing position and the first-shutter open position, the first engaging member being pivotable together with the first shutter in a state where the first engaging member is engaged with the first shutter, wherein the second shutter is pivotable between the second-shutter closing position and the second-shutter open position, the second engaging member being pivotable together with the second shutter in a state where the second engaging member is engaged with the second shutter, and wherein the shutter driving member includes:

a first rack part in meshing engagement with the first gear; and a second rack part in meshing engagement with the second gear.

8. The image-forming apparatus according to claim 1, further comprising a housing side plate provided inside the housing, the housing side plate having the first guide and the second guide, wherein the first drum cartridge further includes a first drum side plate supporting one end portion of the first photosensitive drum in the first direction, and wherein the first shutter is positioned between the first drum side plate and the housing side plate in the first direction in the state where the first drum cartridge is attached to the housing.

9. The image-forming apparatus according to claim 1, further comprising:

a first waste toner shutter movable between a first-waste-toner-shutter closing position and a first-waste-toner-shutter open position relative to the waste toner tube, the first waste toner shutter closing the first waste toner inlet opening when the first waste toner shutter is at the first-waste-toner-shutter closing position, the first waste toner shutter opening the first waste toner inlet opening when the first waste toner shutter is at the first-waste-toner-shutter open position; and a second waste toner shutter movable between a second-waste-toner-shutter closing position and a second-waste-toner-shutter open position relative to the waste toner tube, the second waste toner shutter closing the second waste toner inlet opening when the second waste toner shutter is at the second-waste-toner-shutter closing position, the second waste toner shutter opening the second waste toner inlet opening when the second waste toner shutter is at the second-waste-toner-shutter open position.

10. The image-forming apparatus according to claim 1, further comprising a conveying member positioned in the interior of the waste toner tube and configured to convey the waste toner inside the waste toner tube.

11. The image-forming apparatus according to claim 1, wherein the first drum cartridge and the second drum cartridge are aligned with each other in the second direction in the state where both the first drum cartridge and the second drum cartridge are attached to the housing.

12. The image-forming apparatus according to claim 1, wherein the first guide and the second guide extend in the third direction.

* * * * *